(12) United States Patent
Kawakami et al.

(10) Patent No.: US 7,236,684 B2
(45) Date of Patent: Jun. 26, 2007

(54) EDITING APPARATUS AND EDITING METHOD

(75) Inventors: Takashi Kawakami, Tokyo (JP); Kii Manabu, Tokyo (JP)

(73) Assignee: Sony Corporation, Tokyo (JP)

( * ) Notice: Subject to any disclaimer, the term of this patent is extended or adjusted under 35 U.S.C. 154(b) by 1152 days.

(21) Appl. No.: 09/817,504

(22) Filed: Mar. 26, 2001

(65) Prior Publication Data

US 2002/0012522 A1    Jan. 31, 2002

(30) Foreign Application Priority Data

Mar. 27, 2000  (JP) .............................. 2000-090721

(51) Int. Cl.
   *H04N 5/93* (2006.01)
(52) U.S. Cl. .............................. 386/52; 386/55; 386/65
(58) Field of Classification Search ................ 386/52, 386/55, 65, 46
   See application file for complete search history.

(56) References Cited

U.S. PATENT DOCUMENTS 5,930,446 A * 7/1999 Kanda .......................... 386/52
6,064,793 A * 5/2000 Furuyama ..................... 386/52
6,094,522 A * 7/2000 Ito et al. ........................ 386/52
6,341,192 B1 * 1/2002 Fujinami ...................... 386/52

FOREIGN PATENT DOCUMENTS

| | | |
|---|---|---|
| EP | 0 860 797 | 8/1998 |
| GB | 2 328 550 | 2/1999 |
| GB | 2 336 022 | 10/1999 |
| GB | 2 342 216 | 4/2000 |

* cited by examiner

*Primary Examiner*—Huy T. Nguyen
(74) *Attorney, Agent, or Firm*—Finnegan, Henderson, Farabow, Garrett & Dunner, L.L.P.

(57) ABSTRACT

An editing apparatus for editing coded data coded in a predetermined unit to be stored into a storage medium includes a designation section, an evaluation section and a notification section. The designation section designates an editing position of the coded data. The evaluation section evaluates a playback state when the coded data are played back from the editing position designated by the designation section. The notification section notifies a user of the editing apparatus of an evaluation result by the evaluation section.

18 Claims, 22 Drawing Sheets

F I G. 3

| | MD-DATA2 | MD-DATA1 |
|---|---|---|
| TORACK PITCH | 0.95 μm | 1.6 μm |
| PIT LENGTH | 0.39 μm/bit | 0.59 μm/bit |
| λ・NA | 650nm・0.52 | 780nm・0.45 |
| RECORDING SYSTEM | LAND RECORDING | GROOVE RECORDING |
| ADDRESS SYSTEM | INTERLACE ADDRESSING (ONE SIDE WOBBLE OF DOUBLE SPIRALS) | OPPOSITE SIDE WOBBLES OF SINGLE SPIRAL CONVOLUTION |
| MODULATION SYSTEM | RLL(1,7) | EFM |
| ERROR CORRECTION SYSTEM | RS-PC | ACIRC |
| INTERLEAVE | BLOCK COMPLETED | CONVOLUTION |
| REDUNDANCY | 19.7% | 46.3% |
| LINEAR VELOCITY | 2.0m/s | 1.2m/s |
| DATA RATE | 589kB/s | 133kB/s |
| RECORDING CAPACITY | 650MB | 140MB |

DATA STRUCTURE IN DISK

AV PACKET STRUCTURE

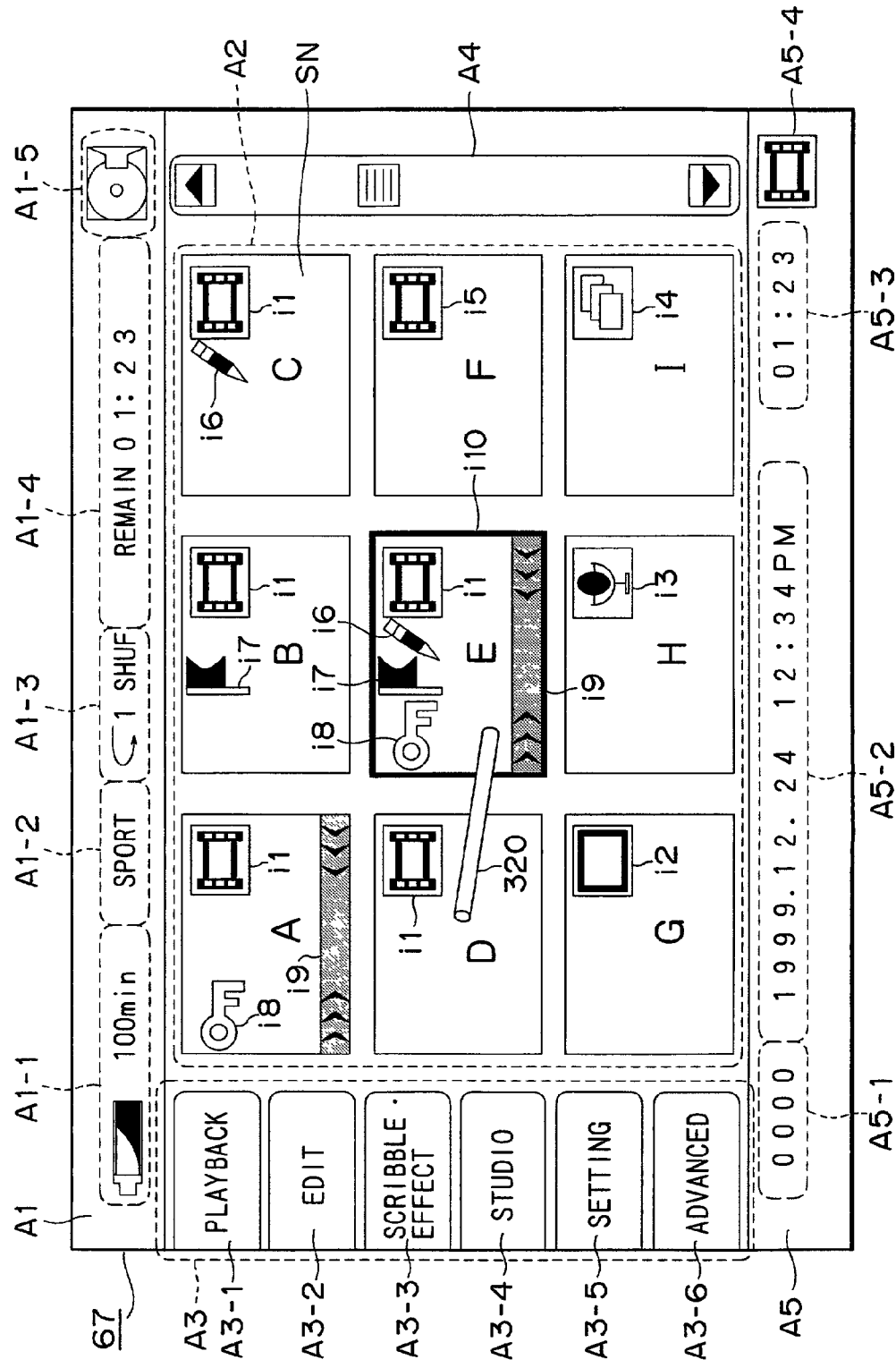

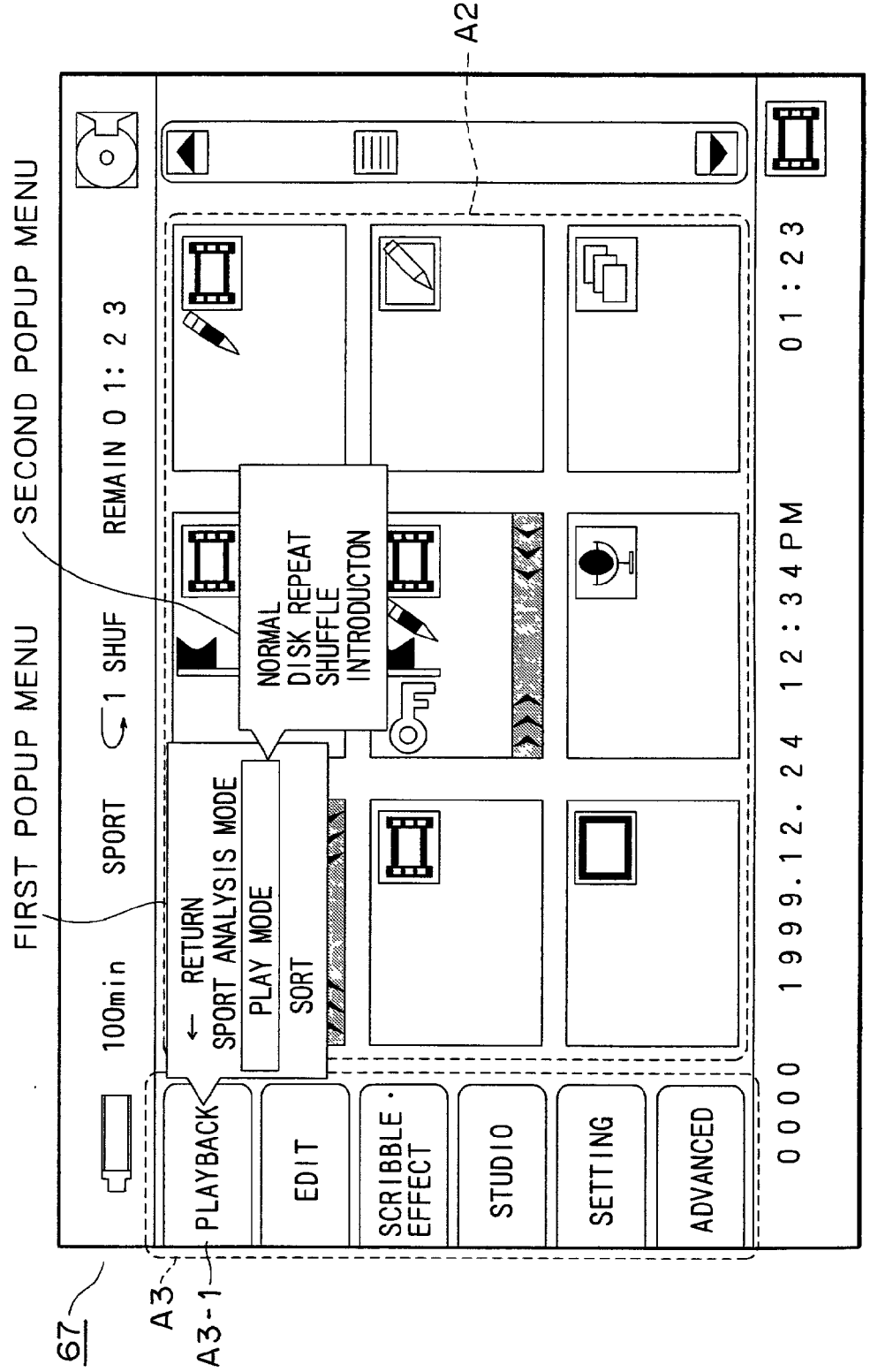

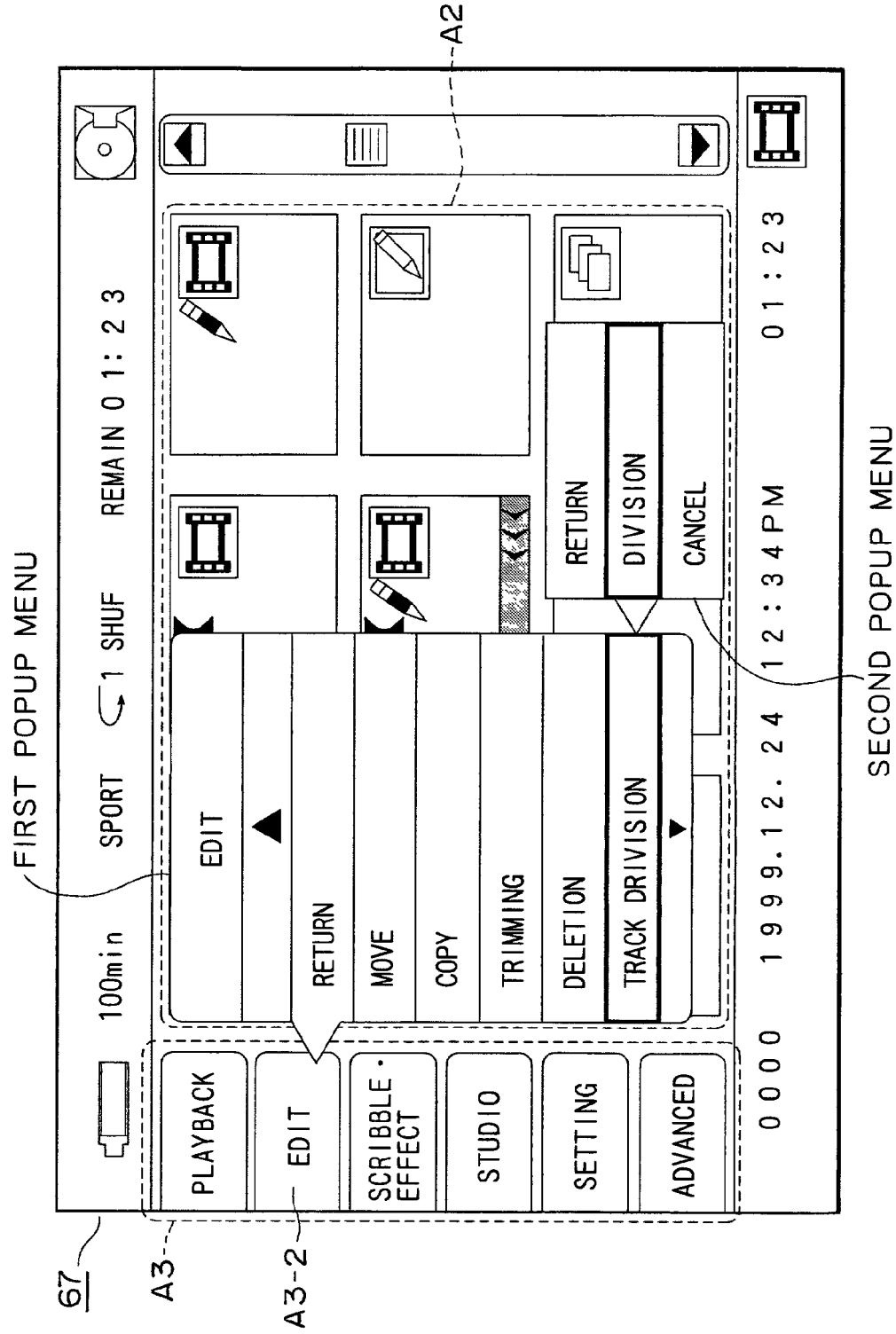

[SELECT THUMBNAIL IMAGE TO BE DIVIDED]

[FINE ADJUSTMENT BY OPERATION OF "RETURN" OR "ADVANCE"]

[OPERATE "PAUSE" AT POSITION FOR DIVISION]

[EXECUTE DIVISION BY OPERATION OF "EXECUTE"]

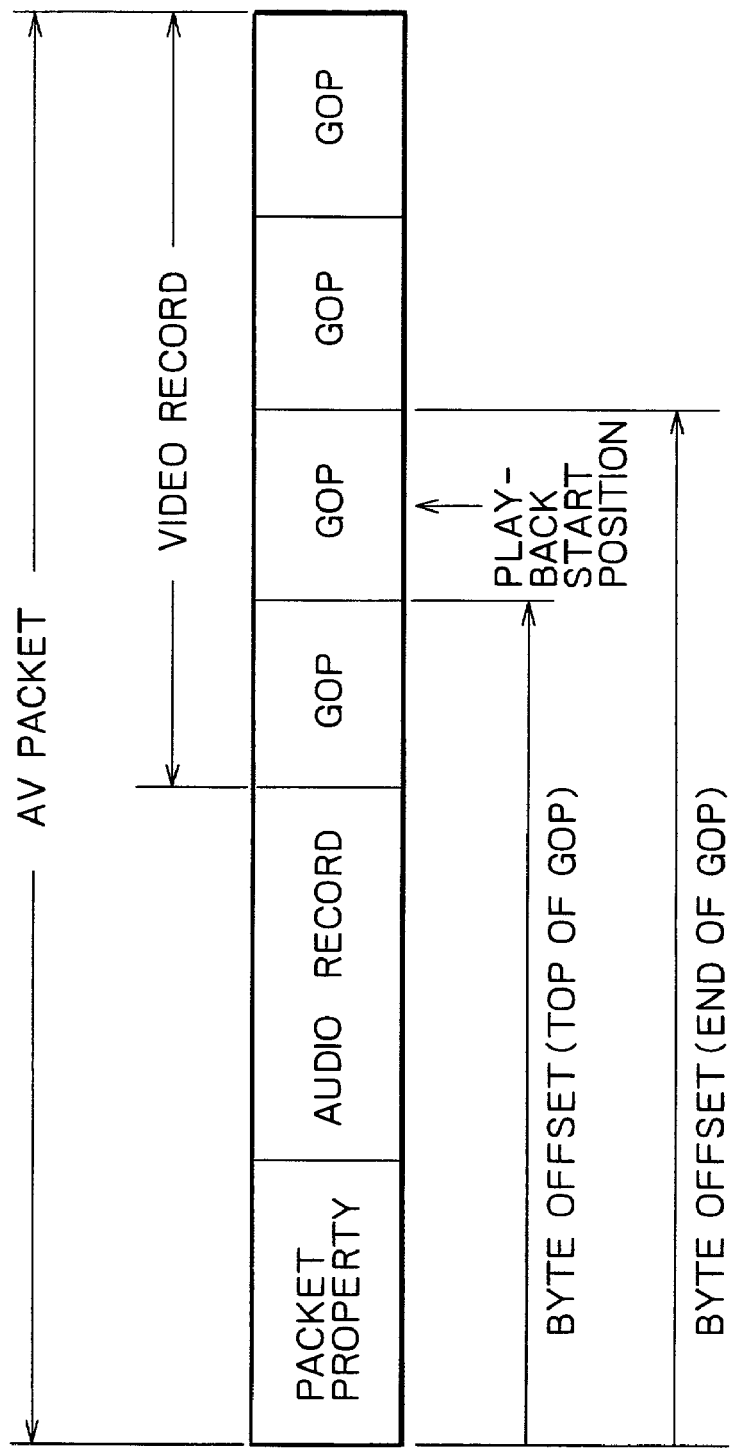
F I G. 18

EDITING APPARATUS AND EDITING METHOD

BACKGROUND OF THE INVENTION

This invention relates to an editing apparatus and an editing method which can perform, for example, division of data as editing of coded data.

A digital video apparatus which can record and play back moving picture data and edit recorded moving picture data such as, for example, a digital video camera has been popularized.

Since moving picture data have a great volume, compression coding of such moving picture data is employed popularly in order to record the moving picture data onto a recording medium. For example, the MPEG format is widely known as a format for such compression coding of image data.

As one of editing operations for image data by a digital video apparatus, it is sometimes performed to divide, for example, a file of moving picture data into a plurality of files.

As a processing method for division editing of such a moving picture file, it is proposed not to actually perform processing directly for image data recorded on a recording medium but to describe a dividing position for image data, for example, with describing information for playback control called script. A digital video apparatus recognizes the dividing position described in the script and performs playback in such a manner that also a file obtained by the division editing is handled as a file.

By the way, as one of cases wherein division editing of a file is performed in accordance with a script in such a manner as described above, a case is considered wherein, for example, moving picture data are data compressed and coded in accordance with the MPEG (Motion Picture Experts Group) system.

In this instance, if playback is started from a moving picture data file actually obtained by division editing, then longer time than that in an ordinary case is sometimes required until the moving picture file is decoded and then played back and outputted as an image.

Starting of playback and outputting is delayed in this manner, for example, from the following reasons.

As well known in the art, for data compressed and decoded in accordance with the MPEG system, a GOP (Group of Picture) is defined as a decoding data unit. Frame image data as a GOP are decoded through prediction coding performed in accordance with a predetermined order making use of forward or forward and backward frame image data.

Accordingly, depending upon the position of frame image data in a GOP corresponding to a division designation position, a considerable time is required until, while frame image data in the GOP are successively decoded, the frame image in the GOP corresponding to the division designation position is decoded finally and begins to be played back and outputted.

Further, when image data are recorded onto a recording medium, for example, a recording format which conforms with the recording medium is used. However, where, for example, a packet in which more than one GOP are placed is defined as the recording format, also depending upon the division designation position in the packet, a considerable time is required until the division designation position is read in.

However, since a general user does not know that the phenomenon that longer time than that in an ordinary case is required to start playback and outputting of a moving picture data file obtained by division editing arises from such a format as described above, if the phenomenon is left as it is, it imposes stress on the user and deteriorates the reliability of the apparatus.

SUMMARY OF THE INVENTION

It is an object of the present invention to provide an editing apparatus and an editing method by which, where division editing of coded data such as, for example, moving pictures is possible, the stress on a user caused by the fact that much time is required until a file obtained by the division editing is played back and outputted is eliminated as much as possible to achieve high reliability.

In order to attain the object described above, according to an aspect of the present invention, there is provided an editing apparatus for editing coded data coded in a predetermined unit to be stored into a storage medium, comprising designation means for designating an editing position of the coded data, evaluation means for evaluating a playback state when the coded data are played back from the editing position designated by the designation means, and notification means for notifying a user of the editing apparatus of an evaluation result by the evaluation means.

In the editing apparatus, when division editing of data coded in a predetermined unit is to be performed, evaluation of a playback state is performed and a result of the evaluation is conveyed to a user. Consequently, for example, the user can grasp and recognize at least what playback state is obtained as a result of the division editing performed by the user itself.

More particularly, when an editing operation of designating a dividing position of data such as moving pictures compressed and coded in accordance with, for example, the MPEG system is performed, a playback state regarding playback of the data from the dividing position is evaluated, and a result of the evaluation is conveyed to a user.

Consequently, the user can know and grasp a playback state caused by an editing operation of the user itself in advance from at least the evaluation result conveyed to the user, and also when playback is performed actually, the user is prevented from suffering from much stress or an uneasy feeling. Further, the user can refer to the evaluation result conveyed thereto to perform editing. For example, the user can set the dividing position so that an evaluation result as good as possible may be obtained. In this manner, with the editing apparatus, for example, it is possible for the user to readily obtain a better editing result, and augmented reliability and convenience of use can be achieved.

The evaluation means may output, as the evaluation result, a playback standby time required to start playback outputting after an instruction to play back and output the coded data from the editing position is issued. Thus, the evaluation result to be conveyed to the user is set to a playback standby time until playback and outputting of data from the dividing position is started. Where coded data are involved, the time required till playback and outputting of data can vary depending upon the dividing position, and such playback standby time is waiting time to the user. Accordingly, conveyance of such playback standby time is useful information to the user, which further augments the convenience of use.

The evaluation means may output a playback continuity degree representative of continuity of playback based on the playback standby time to be outputted, and the notification means causes the playback continuity degree outputted from the evaluation means to be displayed on a display section. If, as a manner of conveying the evaluation result, the playback standby time is presented in the form of a ratio, then the user can grasp it more readily than in an alternative case wherein the playback standby time is presented, for example, as time as it is.

The evaluation means may arithmetically operate, as the playback standby time, at least a data readout time required to read out packet data including a plurality of coded data units from the top of the packet data to that one of the coded data units which includes the editing position, or a decoding time required to decode the coded data unit including the editing position up to the coded data including the editing position, the playback standby time being arithmetically operated by addition of the decoding time to the data readout time. This allows an evaluation result higher in accuracy and reliability to be obtained.

According to another aspect of the present invention, there is provided an editing apparatus for editing coded image data having a plurality of groups of picture, comprising a decoding section for decoding the coded image data and outputting decoded image data, a display section for displaying the decoded image data outputted from the decoding section, a display control section for controlling the display section to temporarily stop the display with a frame or field at a desired position of the decoded image data displayed by the display section in accordance with an instruction of a user, and an evaluation section for evaluating, when the decoded image data are divided into first image data and second image data in accordance with the instruction of the user, a playback state of the second image data, the display control section controlling the display section to display an evaluation result by the evaluation section.

In the editing apparatus, it is possible for a user to perform a designation operation for the desired position as a dividing position so as to change the dividing position currently set. Consequently, the user can change the dividing position while referring to the evaluation result conveyed to the user then through the display on the display section. Therefore, the operability for division editing is augmented. Further, since the evaluation result is conveyed through the display, the user can visually grasp the evaluation result.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 3 is a table showing specifications of the disk shown in FIG. 1;

FIG. 13 is a schematic view showing an example of a display form of an operation screen (thumbnail display) of the video camera;

FIG. 14 is a schematic view illustrating an example of an operation for a playback menu key;

FIG. 15 is a schematic view illustrating an operation procedure for establishing a track division mode through a display form of a display panel section;

FIG. 18 is a diagrammatic view illustrating calculation of a byte offset detected upon playback processing;

DESCRIPTION OF THE PREFERRED EMBODIMENT

An editing apparatus according to a preferred present embodiment of the present invention described below is incorporated in a portable video camera wherein a camera apparatus section and a recording and playback apparatus section which can perform recording and playback of an image (a still picture or a moving picture), sound and so forth are integrated with each other. Further, the recording and playback apparatus section incorporated in the video camera of the present embodiment adopts a construction wherein data are recorded onto and played back from a so-called mini disk which is known as a kind of magneto-optical disk.

The description proceeds in the following order.
1. Disk Format
2. Appearance of the Video Camera
3. Internal Construction of the Video Camera
4. Construction of the Medium Drive Section
5. Example of the Disk Structure Ready for the Video Camera
6. Thumbnail Image Production Process
7. Script
8. Operation Screen Display
9. File Dividing Processing
   9-1. File Division Editing Operation
   9-2. Playback Processing 9-3. Playback standby Time
9-4. Division Editing Processing

1. Disk Format

The recording and playback apparatus section incorporated in the video camera of the present embodiment is ready for a format called MD data in accordance with which data are recorded onto and played back from a mini disk (magneto-optical disk). For the MD data format, two different formats called MD-DATA1 and MD-DATA2 have been developed, and the video camera of the present embodiment performs recording and playback in accordance with the format of MD-DATA2 which allows higher density recording than MD-DATA1. Therefore, the disk format of MD-DATA2 is described first.

Figure 1:
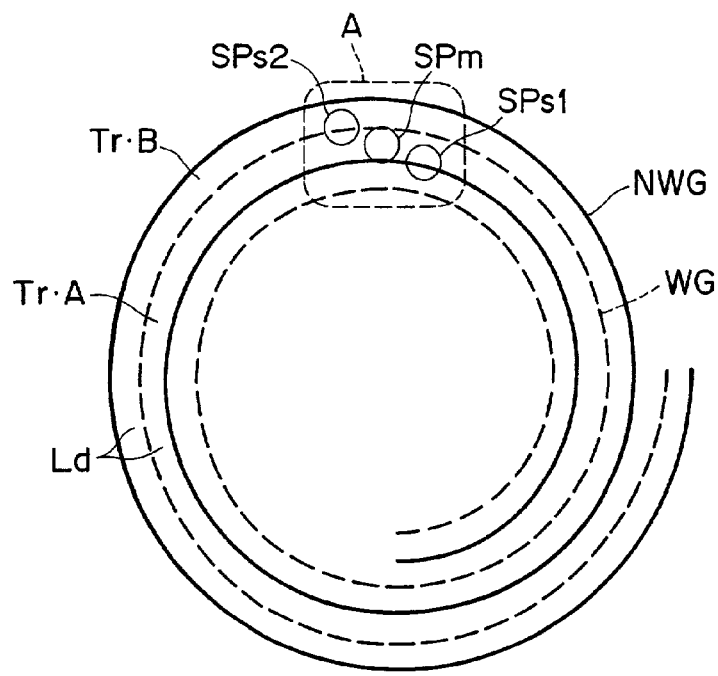
FIG. 1 is a schematic view showing a track structure of a disk ready for a video camera to which the present invention is applied.
Figures 2A, 2B:
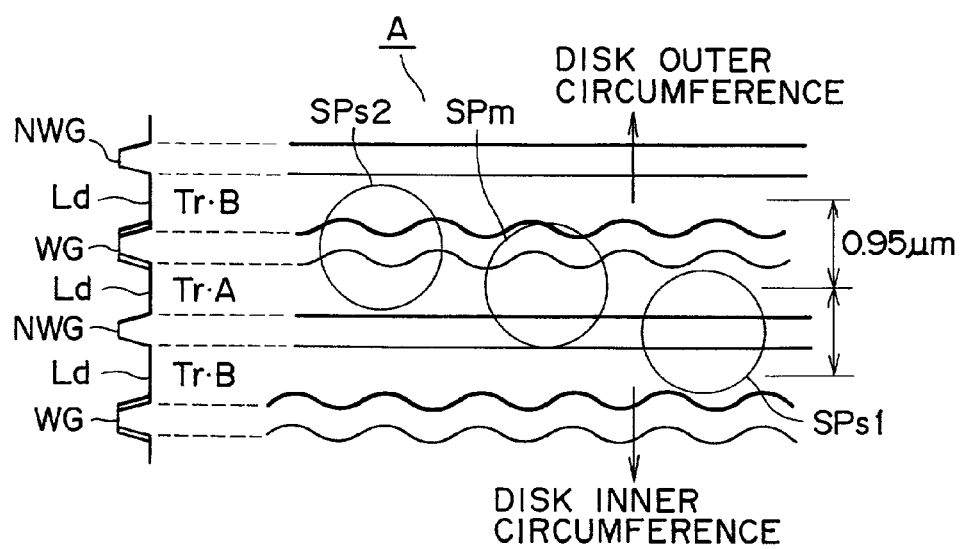
FIGS. 2A and 2B are a sectional view and a top plan view, respectively, showing, in an enlarged scale, a track portion of the disk shown in FIG. 1.

FIGS. 1, 2A and 2B show an embodiment of a track structure of a disk of the MD-DATA2 format. Particularly, FIGS. 2A and 2B are a sectional view and a top plan view, respectively, showing in an enlarged scale a portion surrounded by a broken line A of FIG. 1.

As shown in those figures, two kinds of grooves including a wobbled groove WG to which wobbling (meandering) is provided and a non-wobbled groove NWG to which no wobbling is provided are formed in advance on a face of the disk. The wobbled groove WG and the non-wobbled groove NWG are present in the form of double spirals on the disk such that lands Ld are formed between them.

In the MD-DATA2 format, the lands Ld are utilized as recording tracks (tracks on which data are recorded), and since the wobbled groove WG and the non-wobbled groove NWG are formed in such a manner as described above, two tracks Tr•A and Tr•B are formed independently of each other in the form of double spirals (double spirals) as recording tracks.

The track Tr•A is a track on the disk outer circumference side of which the wobbled groove WG is positioned and on the disk inner circumference side of which the non-wobbled groove NWG is positioned.

In contrast, the track Tr•B is a track on the disk inner circumference side of which the wobbled groove WG is positioned and on the disk outer circumference side of which the non-wobbled groove NWG is positioned.

In short, it can be regarded that, with respect to the track Tr•A, wobbling is formed on only one side, that is, on the disk outer circumference side, but with respect to the track Tr•B, wobbling is formed on only one side, that is, on the disk inner circumference side.

In this instance, the track pitch is a distance between the centers of the track Tr•A and the track Tr•B which are adjacent each other, and as shown in FIG. 2B, the track pitch is 0.95 µm.

The wobbling formed on a groove as the wobbled groove WG is formed in accordance with a signal obtained by encoding physical addresses on the disk by FM modulation+biphase modulation. Therefore, upon recording or playback, a physical address on the disk can be extracted by demodulation processing of playback information obtained from the wobbling provided to the wobbled groove WG.

Further, the address information of the wobbled groove WG is effective commonly to the tracks Tr•A and Tr•B. In short, the track Tr•A positioned on the inner circumference and the track Tr•B positioned on the outer circumference across the wobbled groove WG commonly have the address information by the wobbling provided to the wobbled groove WG.

It is to be noted that such an addressing system as described above is called interlace addressing system. By adopting the interlace addressing system, for example, it is possible to reduce the track pitch while crosstalk between adjacent wobbles is suppressed. Further, the system wherein an address is recorded by forming wobbles on a groove is called also ADIP (Adress In Pregroove) system.

Further, identification of which one of the tracks Tr•A and Tr•B which commonly have the same address information in such a manner as described above is being traced can be performed in the following manner.

For example, it is a possible idea to apply, for example, a three-beam system such that, in a state wherein a main beam is tracing a track (a land Ld), the remaining two side beams are tracing the grooves positioned on the opposite sides of the track being traced by the main beam.

In FIG. 2B, a state wherein a main beam spot SPm is tracing the track Tr•A is illustrated as an embodiment. In this instance, of two side beam spots SPs1 and SPs2, the side beam spot SPs1 on the inner circumference side traces the non-wobbled groove NWG while the side beam spot SPs2 on the outer circumference side traces the wobbled groove WG.

On the other hand, though not shown, in another state wherein the main beam spot SPm is tracing the track Tr•B, the side beam spot SPs1 traces the wobbled groove WG while the side beam spot SPs2 traces the non-wobbled groove NWG.

In this manner, between the case wherein the main beam spot SPm traces the track Tr•A and the case wherein the main beam spot SPm traces the track Tr•B, the grooves to be traced by the side beam spots SPs1 and SPs2 are inevitably exchanged between the wobbled groove WG and the non-wobbled groove NWG.

Since detection signals obtained from photo-detectors by reflection of the side beam spots SPs1 and SPs2 have waveforms which are different depending upon which one of the wobbled groove WG and the non-wobbled groove NWG is being traced, which one of the tracks Tr•A and Tr•B is being traced by the main beam can be identified by discriminating, for example, which one of the side beam spots SPs1 and SPs2 is currently tracing the wobble groove WG (or the non-wobbled groove NWG).

FIG. 3 illustrates principal specifications of the MD-DATA2 format having such a track structure as described above in comparison with the MD-DATA1 format.

First, in the MD-DATA1 format, the track pitch is 1.6 µm, and the pit length is 0.59 µm/bit. Further, the laser wavelength $\lambda$ is $\lambda$=780 nm, and the numerical aperture NA of the optical head is NA=0.45.

As a recording system, the groove recording system is used. In short, a groove is used as a track for recording and playback.

As an address system, a system, is adopted, which makes use of a wobbled groove obtained by forming a groove (track) in the form of a single spiral and forming wobbles as address information on the opposite sides of the groove.

As a modulation system for recording data, an EFM (8-14 conversion) system is adopted. Further, as an error correction system, the ACIRC (Advanced Cross Interleave Reed-Solomon Code) is adopted, and for data interleaving, that of the convolution type is adopted. Consequently, the redundancy of data is 46.3%.

Further, in the MD-DATA1 format, the CLV (Constant Linear Velocity) is adopted as a disk driving system, and the linear velocity of the CLV is 1.2 m/s.

Then, the standard data rate upon recording and playback is 133 kB/s, and the recording capacity is 140 MB.

In contrast, in the MD-DATA2 format for which the video camera of the embodiment is ready, the track pitch is 0.95

μm and the pit length is 0.39 μm/bit, and it can be seen that both of them are shorter than those of the MD-DATA1 format. And, for example, in order to realize the pit length, the laser wavelength λ is set to λ=650 nm and the numerical aperture NA of the optical head is set to NA=0.52 so that the beam spot diameter at an in-focus position is restricted and the band of the optical system is increased.

As a recording system, as described above with reference to FIGS. 1, 2A and 2B, the land recording system is adopted, and as an addressing system, the interlace addressing system is adopted. Further, as a modulation system for recording data, a RLL(1, 7) system (RLL: Run Length Limited) which is suitable for high density recording is adopted, and the RS-PC system is adopted as an error correction system and the block completed type data interleaving is used for the data interleaving. And, as a result of adoption of the systems described above, it is possible to suppress the redundancy of data down to 19.7%.

Also in the MD-DATA2 format, the CLV is adopted as a disk driving system, and the linear velocity of the CLV is 2.0 m/s and the standard data rate upon recording and playback is 589 kB/s. A recording capacity of 650 MB can be obtained, and when compared with the MD-DATA1 format, higher density recording of four times or more is realized.

For example, if it is assumed to effect recording of a moving picture in accordance with the MD-DATA2 format, then where compression coding in accordance with the MPEG2 is performed for the moving picture data, moving pictures for 15 to 17 minutes in time can be recorded although depending upon the bit rate of coded data. Further, if only sound signal data are recorded, then when compression processing in accordance with the ATRAC (Adaptive Transform Acoustic Coding) is performed for the sound data, recording for approximately 10 hours in time can be performed.

2. Appearance of the Video Camera

Subsequently, an appearance of the video camera of the present embodiment is described.

Referring to FIGS. 6A, 6B, 7A and 7B, a camera lens 201 including an image pickup lens, an iris and so forth for picking up an image is provided on a front face portion of a body 200 of the video camera such that it is exposed outside. Further, a microphone 202 for collecting external sound upon picking up of an image is provided on the lower side of a rear face portion of the body 200. In short, the present video camera can perform recording of an image picked up by the camera lens 201 and recording of stereo sound collected by the microphone 202. Further, also a speaker 205 for outputting playback sound is provided at the same position as the microphone 202 Furthermore, also required message sound by beep sound or the like is outputted from the speaker 205

A viewfinder 204 is provided on the rear face side of the body 200, and during recording operation, during standby or the like, an image (also called through picture) captured from the camera lens 201, a character image or the like is displayed on the viewfinder 204. A user can perform image picking up while watching the viewfinder 204.

Further, a location at which a main dial 300, a release key 301 and a delete key 302 which are hereinafter described are provided is openable and closeable as a battery lid section 206, and by opening the battery lid section 206, a battery (rechargeable cell) can be loaded into and unloaded from the body 200.

Meanwhile, a movable panel section 203 is provided on a side of the body 200. The movable panel section 203 is supported on a movable support section 208 such that it is mounted for movement with respect to the body 200. Movements of the movable panel section 203 are hereinafter described.

Further, a display panel 67 (display screen) is provided on the rear face side of the movable panel section 203. Accordingly, when the movable panel section 203 is in an accommodated state as shown in FIG. 6B, the display panel 67 is accommodated while it is directed to the body side.

The display panel 67 is a member for displaying or outputting a picked up image, an image played back by the internal recording and playback apparatus and so forth. Further, also message displaying or the like by letters, characters and so forth for informing a user of a required message is performed by the display panel 67 in response to an action of the apparatus. It is to be noted that, while the display device to be adopted actually as the display panel 67 is not particularly limited here, for example, a liquid crystal display unit or the like may be used.

Further, the display panel 67 has provided, for example, on the rear face side of the display face of a liquid crystal display unit a touch panel which senses a depression operation and outputs this as operation information. In short, in the present embodiment, an operation as so-called GUI wherein a depression operation upon an image displayed on the display panel 67 is performed is allowed.

Here, in regard to an operation for the display panel 67, since it is constructed such that a position at which the depressing force is applied to the touch panel is detected as coordinate position information, it may be operated with a finger or the like. However, taking it into consideration that there is a limitation to the display area of the display panel 67 and it sometimes is difficult to perform such a pointing operation with a finger, a pen 320 in the form of a stick is provided as shown in FIG. 6B. A user can use the pen 320 in place of its finger to perform a pointing (touching) operation on the display panel 67.

Meanwhile, a location on the body 200 side in which the movable panel section 203 is accommodated is formed as a disk loading/unloading section 210, and a disk as a recording medium for which the video camera of the embodiment is ready can be inserted into or discharged from the disk loading/unloading section 210.

Further, though not shown here, actually a video output terminal for outputting a playback image signal and so forth to an external video apparatus, a headphone/line terminal for outputting a playback sound signal to an external audio apparatus or headphone and so forth are provided. Furthermore, also an I/F terminal and so forth are provided corresponding to an interface function for performing data transfer to and from an external data apparatus.

Further, various operation elements for user operations are provided at several locations of the body 200. In the following, principal operation elements are described.

Figure 7B:
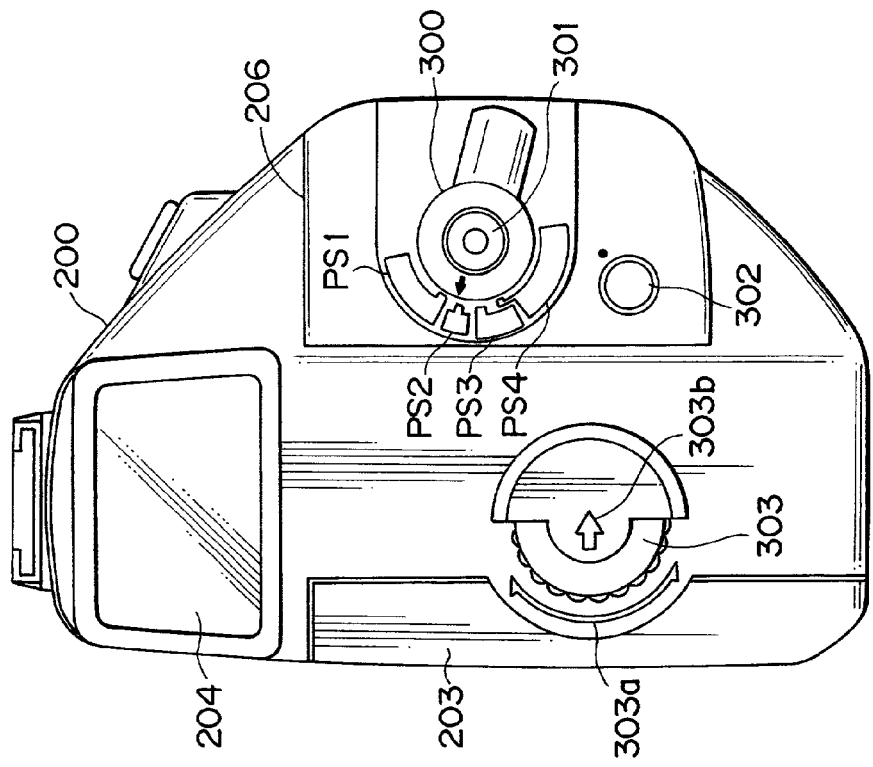
FIGS. 7A and 7B are a front elevational view and a rear elevational view, respectively, of the video camera.
Figure 7A:
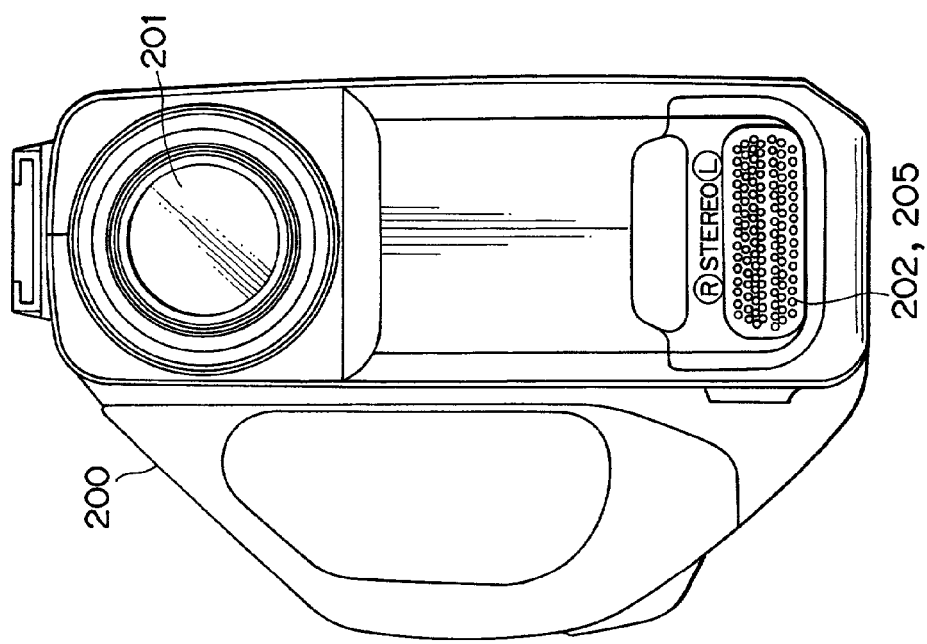

The main dial 300 is provided on the rear side of the body 200 in such a manner as shown in FIG. 7B, and serves as an operation element for setting on/off, a recording operation, or a playback operation of the video camera. In this instance, the main dial 300 allows a rotating operation thereof.

When the main dial 300 is at a power supply off position PS2, the power supply is in an off state. Then, for example, if, from this state, the main dial 300 is rotationally operated to a playback/editing position PS1, then the video camera is brought into an on-state of the power supply, and a mode state wherein playback of a recorded picture file and various editing operations can be performed is established. Further, if a rotating operation to the camera mode position PS2 is performed, then the camera is brought into a mode (camera mode) wherein a recorded picture file of a moving picture or a still picture can be recorded in a power supply on-state. Further, when the main dial 300 is positioned to the camera mode position PS2, an interview mode is established.

The interview mode is a mode wherein, although detailed description is omitted here, as a recording operation, recording of sound is principally performed and, if the release key 301 or a photo key 304 which are hereinafter described is depressed at any time, then an image picked up at the point of time is recorded as a still picture. Then, in playback in the interview mode, a recorded picture file recorded in the interview mode is played back. In this instance, for example, while sound is played back, still pictures are switchably displayed successively at timings same as those upon recording.

Further, the release key 301 is provided at the center of the rotatable portion of the main dial 300.

The release key 301 functions as an operation element for starting/ending recording in a state wherein the video camera is in the camera mode or the interview mode.

Also a jog dial 303 is provided at a rear face portion of the body 200. The jog dial 303 is an operation element in the form of a disk and is mounted for rotational operation in the forward/reverse directions such that a click feeling is obtained at each predetermined rotational angle. Here, the rotational direction to the upper side of an arrow mark 303a is the forward direction, and the rotational direction to the lower side is the reverse direction. Further, the jog dial 303 in this instance allows a depression operation thereof in the leftward direction indicated by an arrow mark 303b in FIG. 7B.

This jog dial 303 is actually combined, for example, with a two-phase rotary encoder or the like such that, for example, one click may make one rotational step so that information about a rotational step number corresponding to the direction of rotation and the rotational angle is outputted.

The delete key 302 functions as a decision key for performing deletion of data being played back in a predetermined mode.

Figure 6A:
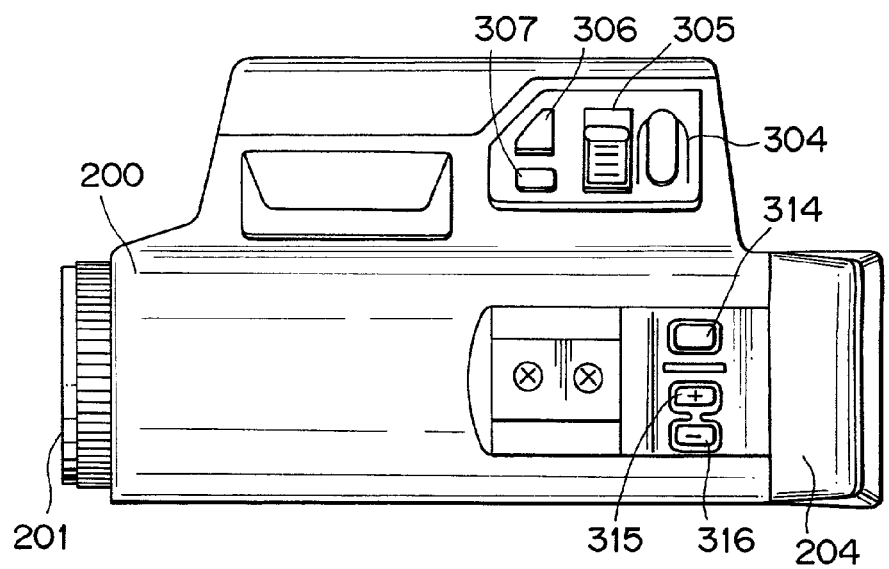
FIGS. 6A and 6B are a side elevational view and a top plan view, respectively, of the video camera.
Figure 6B:
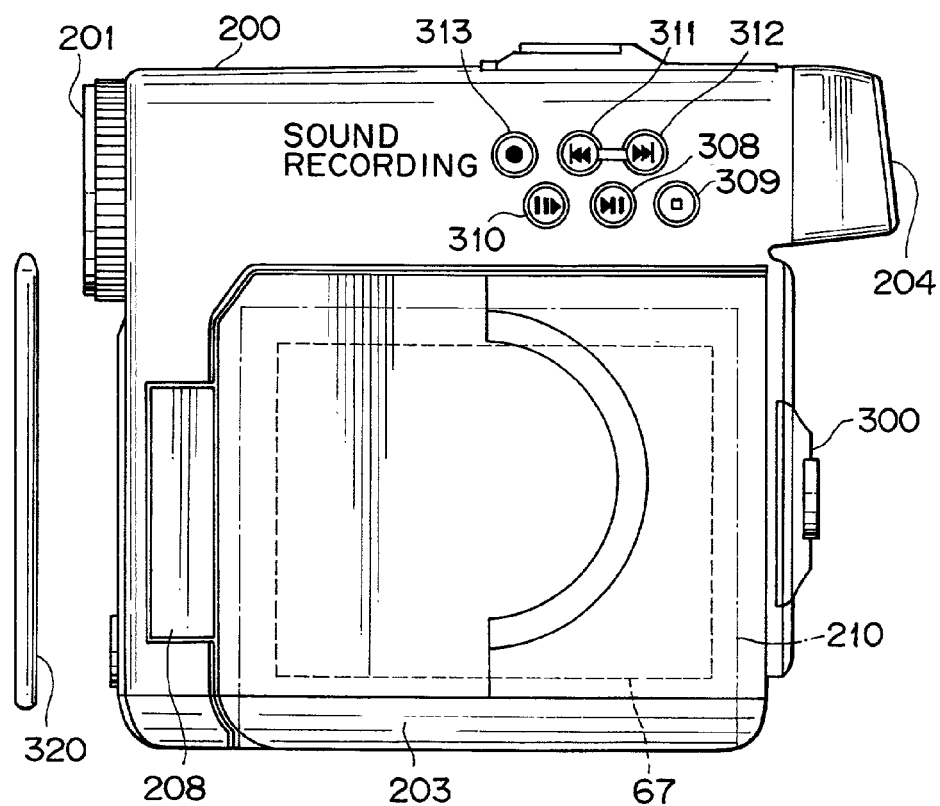

Further, as shown principally in FIG. 6A, the photo key 304, a zoom key 305, a focus key 306 and a backlight correction key 307 are provided in a rather upwardly inclined state on a side face portion of the body 200.

The photo key 304 is an operation member which functions as a shutter for recording a recorded picture file of a still picture by performing a depression operation thereof, for example, in a state of the camera mode.

The zoom key 305 is an operation member for operating a zoom state (telephotography side to wide angle side) of a lens optical system (the camera lens 201).

The focus key 306 is an operation member for changing over the focus states (for example, normal/infinite or the like) of the lens optical system.

The backlight correction key 307 is an operation member for turning on/off a backlight correction function.

Further, as shown in FIG. 6B, a playback/pause key 308, a stop key 309, a slow playback key 310, search keys 311 and 312 and a sound recording key 313 principally as keys relating to recording/playback of a file (track) are provided on a side face portion of the body 200 on the side on which the movable panel section 203 is disposed.

Further, as shown in FIG. 6A, a screen display key 314 for screen display and sound volume keys 315 and 316 for adjusting the sound volume of output sound from the speaker are provided at an upper face portion of the body 200.

It is to be noted that the appearance of the video camera shown in FIGS. 6A, 6B, 7A and 7B is an example at all and may be modified suitably in accordance with conditions of use and so forth required actually for the video camera of the present embodiment. Naturally, various kinds of, types and operation systems of the operation elements, connection terminals to an external apparatus and so forth may be applied to the above video camera.

Further, a manner of movement of the movable panel section 203 described hereinabove is described with reference to FIGS. 8A and 8B. It is to be noted that, in FIGS. 8A and 8B, the appearance of the video camera is shown simplified for the convenience of description.

Figure 8A:
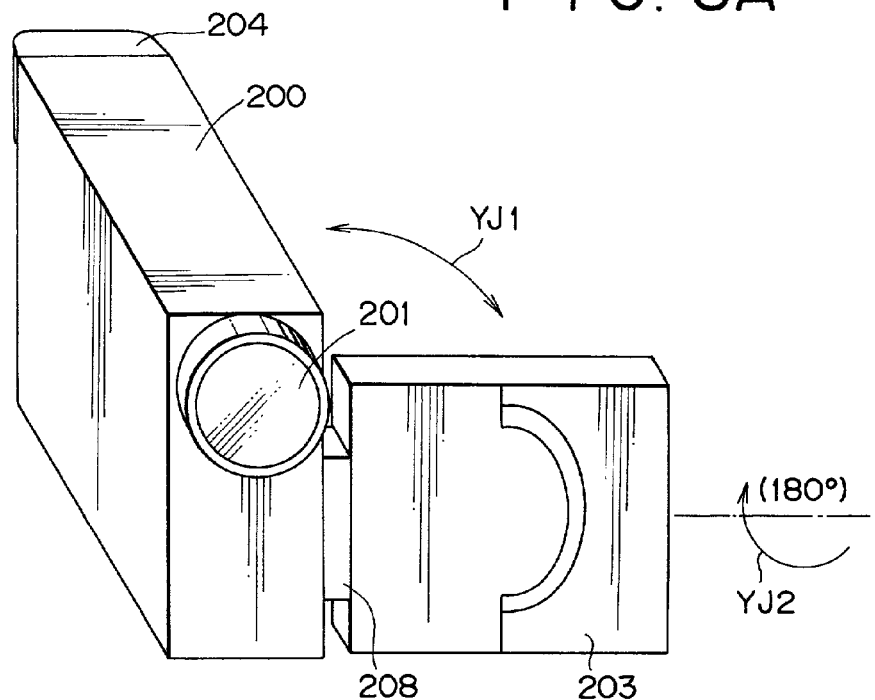
FIGS. 8A and 8B are perspective views illustrating movements of a movable panel section of the video camera.

As movement of the movable panel section 203, the positional state of it can be changed first by pulling it up from the positional state shown in FIG. 6B along a direction of an arrow mark YJ1 as shown in FIG. 8A.

In this instance, the display screen (display panel 67) is directed to a photographer (viewfinder 204) side and consequently is directed in a direction substantially reverse to the camera lens 201 which captures a picked up image. In this positional state of the display panel, for example, the photographer who holds the video camera can perform picking up of an image (image recording) while monitoring a picked up image displayed on the display panel 67.

Further, the movable panel section 203 can be turned within a range of approximate 180° along the direction of an arrow mark YJ2 from the state described above and shown in FIG. 8A. In short, the movable panel section 203 can be placed into a positional state wherein the display panel 67 is directed to the imaging object (camera lens) side as shown in FIG. 8B.

In this state, a user who is on the imaging object side can look at a picked up image.

Figure 8B:
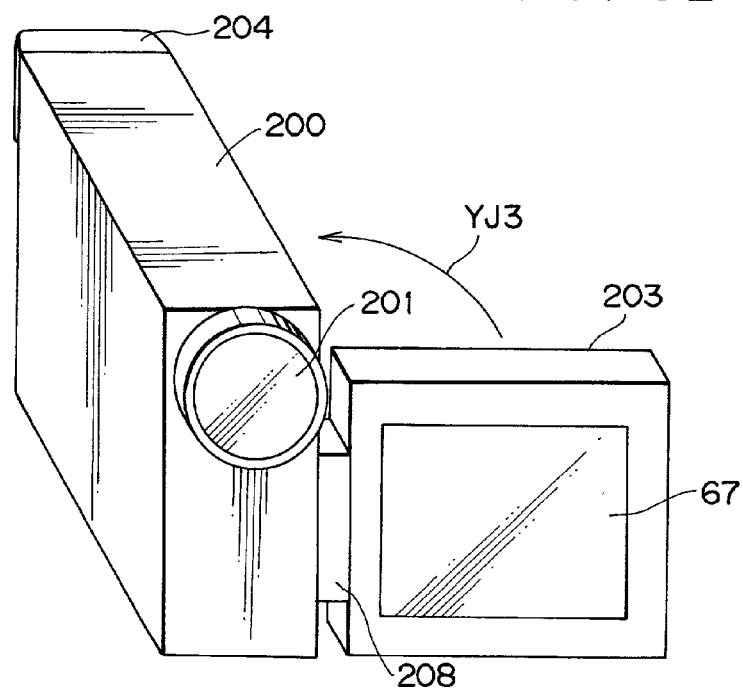

When insertion of a disk into the disk loading/unloading section 205 or removal of a disk from the same is to be performed, it can be performed in a state wherein the movable panel section 203 is raised from the body 200 as shown in FIG. 8A or 8B.

Also it is possible to move the movable panel section 203 in the direction of an arrow mark YJ3 from the state shown in FIG. 8B. By this, though not shown, the movable panel section 203 can be put into an accommodated position while the display panel 67 can be seen from the outside.

It is to be noted that, if the display panel is turned along the direction of the arrow mark YJ2 in such a manner as described above, then when the display panel 67 is directed to the photographer side and when the display panel 67 is directed to the imaging object side, the manner in which the display image looks is reversed in the upward and downward directions and the leftward and rightward directions. However, in the present embodiment, such a disadvantage as just described is eliminated by performing reverse display control so that the display image of the display panel 67 can be observed normally in an appropriate direction from the user (photographer and imaging object) in response to the turned state of the movable panel section 203.

3. Internal Construction of the Video Camera

Figure 4:
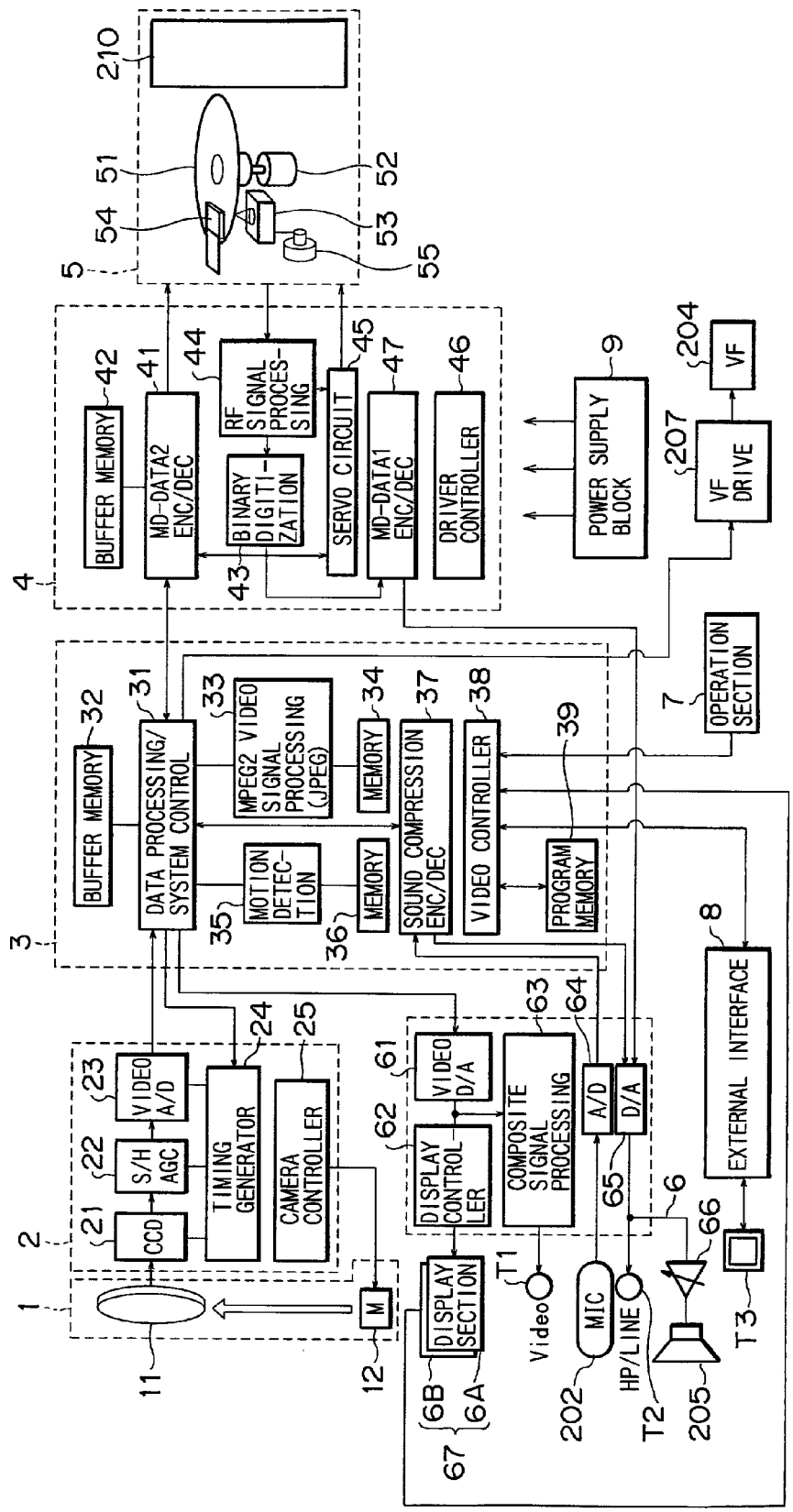
FIG. 4 is a block diagram of an internal construction of the video camera to which the present invention is applied.

FIG. 4 shows of an internal construction of the video camera of the present embodiment.

Referring to FIG. 4, a lens block 1 shown includes an optical system 11 which actually includes, for example, an image pickup lens, an iris and so forth. The camera lens 201 shown in FIGS. 6A and 6B described above is included in the optical system 11. Further, a focusing motor for causing the optical system 11 to perform an automatic focusing action, a zoom motor for performing movement of a zoom lens in response to an operation of the zoom key 304 described above and so forth are provided as a motor section 12 in the lens block 1.

A camera block 2 principally includes a circuit section for converting image light picked up by the lens block 1 into a digital image signal.

An optical image of an imaging object which has passed through the optical system 11 is provided to a CCD (Charge Coupled Device) 21 of the camera block 2. The CCD 21 performs photoelectric conversion of the optical image to produce a picked up image signal and supplies it to a sample hold/AGC (Automatic Gain control) circuit 22. The sample hold/AGC circuit 22 performs gain adjustment for the picked up image signal outputted from the CCD 21 and performs sample hold processing to perform waveform shaping. An output of the sample hold/AGC circuit 2 is supplied to a video A/D converter 23, by which it is converted into image signal data in the form of digital data.

Signal processing timings of the CCD 21, sample hold/AGC circuit 22 and video A/D converter 23 described above are controlled with timing signals generated by a timing generator 24. The timing generator 24 receives a clock signal used for signal processing by a data processing/system control circuit 31 (in a video signal processing circuit section 3) which is hereinafter described and generates required timing signals based on the clock signal. Consequently, signal processing timings of the camera block 2 can be synchronized with processing timings of the video signal processing circuit section 3.

A camera controller 25 executes required control so that the various functioning circuit sections described above provided in the camera block 2 may operate appropriately, and performs control for automatic focusing, automatic exposure adjustment, iris adjustment, zooming and so forth of the lens block 1.

For example, for the automatic focusing control, the camera controller 25 controls the rotational angle of the focusing motor based on focusing control information obtained in accordance with a predetermined automatic focusing control system. Consequently, the image pickup lens is driven so as to establish a just in-focus state.

The video signal processing circuit section 3 performs, upon recording, compression processing for a digital image signal supplied thereto from the camera block 2 and a digital audio signal obtained by collection of sound by means of the microphone 202 and supplies such compression data as user recording data to a medium drive section 4 in the following stage. Further, the video signal processing circuit section 3 supplies an image produced based on the digital image signal supplied thereto from the camera block 2 and a character image to a viewfinder drive section 207 so that it is displayed in the viewfinder 204.

On the other hand, upon playback, the video signal processing circuit section 3 performs demodulation processing for user playback data (read out data from a disk 51) supplied thereto from the medium drive section 4, in short, compression processed image signal data and sound signal data, and outputs results of the demodulation processing as a playback image signal and a playback sound signal.

It is to be noted that, in the present embodiment, for the compression/decompression processing system for image signal data (image data), the MPEG (Moving Picture Experts Group) 2 is adopted for a moving picture while the JPEG (Joint Photographic Coding Experts Group) is adopted for a still picture. Meanwhile, for the compression/decompression processing system for audio signal data, the ATRAC (Adaptive Transform Acoustic Coding) 2 is adopted.

A data processing/system control circuit 31 of the video signal processing circuit section 3 principally executes control processing regarding compression/decompression processing of image signal data and sound signal data of the video signal processing circuit section 3 and processing for managing inputting/outputting of data which pass the video signal processing circuit section 3.

Meanwhile, control processing of the entire video signal processing circuit section 3 including the data processing/system control circuit 31 is executed by a video controller 38. The video controller 38 includes, for example, a microcomputer or the like and can communicate mutually with the camera controller 25 of the camera block 2 and a driver controller 46 of the medium drive section 4, which is hereinafter described, over, for example, a bus line or the like not shown.

The video controller 38 includes a program memory 39.

The program memory 39 is formed from a rewritable storage element such as, for example, an EEPROM or a flash memory. The program memory 39 stores information such as various programs to be executed by the video controller 38, which is a master controller, and various setting data.

As basic action of the video signal processing circuit section 3 upon recording, image signal data supplied from the video A/D converter 23 of the camera block 2 are inputted to the data processing/system control circuit 31. The data processing/system control circuit 31 supplies the inputted image signal data, for example, to a motion detection circuit 35. The motion detection circuit 35 utilizes, for example, a memory 36 as a working area to perform image processing such as motion compensation for the inputted image signal data and supplies resulting data to an MPEG2 video signal processing circuit 33.

The MPEG2 video signal processing circuit 33 utilizes, for example, a memory 34 as a working area to perform compression processing for the inputted image signal data in accordance with the format of the MPEG2 and outputs a bit stream (MPEG2 bit stream) of compression data as a moving picture. Further, the MPEG2 video signal processing circuit 33 is constructed such that, for example, when it extracts image data as a still picture from image signal data as a moving picture and performs compression processing for the image data as a still picture, it produces compression image data as a still picture in accordance with the format of the JPEG. It is to be noted that it is a possible idea not to adopt the JPEG but to handle an I picture (Intra Picture), which is normal image data as compression image data according to the format of the MPEG2, as image data of a still picture.

The image signal data (compression image data) compression coded by the MPEG2 video signal processing circuit 33 are written at a predetermined transfer rate into and temporarily stored in, for example, a buffer memory 32.

It is to be noted that, in the format of the MPEG2, as well known in the art, as the so-called coded bit rate (data rate), both of a constant rate (CBR: Constant Bit Rate) and a variable rate (VBR: Variable Bit Rate) are supported, and the video signal processing circuit section 3 is ready for both of them.

For example, when image compression processing at a VBR is to be performed, for example, the motion detection circuit 35 performs motion detection within the range of about tens to hundreds frames in a unit of a macro block and transmits, if it is detected that motion is present, this result of detection as motion vector information to the MPEG2 video signal processing circuit 33.

The MPEG2 video signal processing circuit 33 makes use of required information including the motion vector information to decide a quantization coefficient for each macro block so that image data after compression coding may have a certain required data rate.

To a sound compression encoder/decoder 37, for example, sound collected by the microphone 202 is inputted as sound signal data in the form of digital data through an A/D converter 64 (in a display/image/sound inputting/outputting section 6).

The sound compression encoder/decoder 37 performs the compression processing for the sound signal data inputted thereto in accordance with the format of the ATRAC2 as described above. Also the compression sound signal data are written at a predetermined transfer rate by the data processing/system control circuit 31 to the buffer memory 32, and temporarily stored in the buffer memory 32.

The compression image data and compression sound data can be stored into the buffer memory 32 in such a manner as described above. The buffer memory 32 has a function principally for absorbing a rate difference between the data transfer rate between the camera block 2 or the display/image/sound inputting/outputting section 6 and the buffer memory 32 and the data transfer rate between the buffer memory 32 and the medium drive section 4.

The compression image data and the compression audio data stored in the buffer memory 32, upon reading, are read out successively at predetermined timings and transmitted to an MD-DATA2 encoder/decoder 41 of the medium drive section 4. However, for example, upon playback, actions after the reading out of data stored in the buffer memory 32 until the read out data are recorded onto the disk 51 from the medium drive section 4 through a deck section 5 may be performed intermittently.

Such writing and reading out control of data into and from the buffer memory 32 is executed, for example, by the data processing/system control circuit 31.

Action of the video signal processing circuit section 3 upon playback is generally such as described below.

Upon playback, compression image data and compression sound signal data (user playback data) read out from the disk 51 and decoded in accordance with the MD-DATA2 format by the processing of the MD-DATA2 encoder/decoder 41 (in the medium drive section 4) are transferred to the data processing/system control circuit 31.

The data processing/system control circuit 31 stores, for example, the compression image data and the compression sound signal data inputted thereto into the buffer memory 32 temporarily. Then, reading out of the compression image data and the compression sound signal data from the buffer memory 32 is performed, for example, at a required timing and at a required transfer rate with which matching of playback time bases is obtained, and the compression image data are supplied to the MPEG2 video signal processing circuit 33 while the compression sound signal data are supplied to the sound compression encoder/decoder 37.

The MPEG2 video signal processing circuit 33 performs decompression processing for the inputted compression image data and transmits resulting data to the data processing/system control circuit 31. The data processing/system control circuit 31 supplies the decompression processed image signal data to a video D/A converter 61 (in the display/image/sound inputting/outputting section 6).

The sound compression encoder/decoder 37 performs decompression processing for the compression audio signal data inputted thereto and supplies resulting data to a D/A converter 65 (in the display/image/sound inputting/outputting section 6).

In the display/image/sound inputting/outputting section 6, the image signal data inputted to the video D/A converter 61 are converted into an analog image signal by the video D/A converter 61, and the analog image signal is branched and inputted to a display controller 62 and a composite signal processing circuit 63.

The display controller 62 drives a display section 6A based on the image signal inputted thereto. Consequently, display of a playback image is performed by the display section 6A. Further, the display section 6A not only can perform display of an image obtained by playback from the disk 51 but also can naturally display and output also a picked up image obtained by picking up of an image by the camera section formed from the lens block 1 and the camera block 2 substantially on the real time basis.

Further, the display section 6A performs, in addition to display of a playback image and a picked up image, message display by letters, characters and so forth for informing a user of a required message in response to an action of the apparatus as described hereinabove. In such message display, processing of synthesizing image signal data of required letters, characters and so forth with image signal data to be outputted from the data processing/system control circuit 31 to the video D/A converter 61 may be executed so that the required letters, characters and so forth may be displayed at a predetermined position, for example, by control of the video controller 38.

Further, a touch panel 6B is combined with the display section 6A to form a display panel 67.

The touch panel 6B detects position information of a depression operation performed for the display section 6A and outputs this as operation information to the video controller 38.

The composite signal processing circuit 63 converts the analog image signal supplied thereto from the video D/A converter 61 into a composite signal and outputs the composite signal to a video output terminal T1. For example, if the video camera is connected to an external monitor apparatus or the like through the video output terminal T1, then an image played back by the video camera can be displayed on the external monitor apparatus.

Further, in the display/image/sound inputting/outputting section 6, the sound signal data inputted from the sound compression encoder/decoder 37 to the D/A converter 65 are converted into an analog sound signal by the D/A converter 65, and the analog audio signal is outputted to a headphone/line terminal T2. Further, the analog audio signal outputted from the D/A converter 65 is branched and outputted also to the speaker 205 through an amplifier 66. Consequently, playback sound or the like is outputted from the speaker 205.

An analog sound signal level can be varied in the amplifier 66, and a volume of sound to be outputted from the speaker 205 can be adjusted by the process just described. The control is executed, for example, by the display controller 62 in the display/image/sound in-output section 6 although a control line therefor is omitted in FIG. 4.

The medium drive section 4 principally encodes, upon recording, recording data in accordance with the MD-DATA2 format so as to conform with recording onto a disk and transmits the encoded data to the deck section 5, but upon playback, performs decoding processing for data read out from the disk 51 by the deck section 5 to obtain playback data and transmits the playback data to the video signal processing circuit section 3.

The MD-DATA2 encoder/decoder 41 of the medium drive section 4 receives, upon recording, recording data (compression image data+compression sound signal data) from the data processing/system control circuit 31, performs predetermined encoding processing for the recording data in accordance with the MD-DATA2 format, and temporarily stores the encoded data into a buffer memory 42. Then, the MD-DATA2 encoder/decoder 41 performs reading out at a required timing and transmits the read out data to the deck section 5.

Upon playback, the MD-DATA2 encoder/decoder 41 performs decoding processing in accordance with the MD-DATA2 format for a digital playback signal read out from the disk 51 and inputted thereto through a RF signal processing circuit 44 and a binary digitization circuit 43 and transmits the decoded digital playback signal as playback data to the data processing/system control circuit 31 of the video signal processing circuit section 3.

It is to be noted that, also in this instance, if necessary, the playback data are temporarily stored into the buffer memory 42 and data read out at a required timing from the buffer memory 42 are transmitted and outputted to the data processing/system control circuit 31. Such writing/reading out control into/from the buffer memory 42 is executed by the driver controller 46.

It is to be noted that, even if, for example, upon playback of the disk 51, servo control or the like is lost by a disturbance or the like and reading out of a signal from the disk is disabled, if a playback operation from the disk is restored within a period within which read out data remain stored in the buffer memory 42, then continuity in time sequence as playback data can be maintained.

The RF signal processing circuit 44 performs required processing for a signal read out from the disk 51 to form, for example, a RF signal as playback data and servo control signals such as a focusing error signal and a tracking error signal for servo control of the deck section 5. The RF signal is binary digitized by the binary digitization circuit 43 as described hereinabove and inputted as digital signal data to the MD-DATA2 encoder/decoder 41.

Further, the various servo control signals produced are supplied to a servo circuit 45. The servo circuit 45 executes required servo control of the deck section 5 in accordance with the servo control signals inputted thereto.

It is to be noted that the video camera includes an encoder/decoder 47 ready for the MD-DATA1 format, and also it is possible to encode recording data supplied from the video signal processing circuit section 3 in accordance with the MD-DATA1 format and record it onto the disk 51 or to perform decoding processing for data read out from the disk 51 where the data are encoded in accordance with the MD-DATA1 and transmit and output the decoded data to the video signal processing circuit section 3. In short, the video camera of the present embodiment is constructed such that the compatibility is obtained with regard to both of the MD-DATA2 format and the MD-DATA1 format.

The driver controller 46 is a functioning circuit section for collectively controlling the medium drive section 4.

The deck section 5 is a member formed from a mechanism for driving the disk 51. The deck section 5 has a mechanism (the disk loading/unloading section 210 (refer to FIGS. 6A and 6B)) by which a disk 51 to be loaded can be mounted onto and removed from the deck section 5 and can be replaced by a work of a user. Further, it is presupposed that the disk 51 here is a magneto-optical disk ready for the MD-DATA2 format or the MD-DATA1 format.

In the deck section 5, the disk 51 loaded is driven to rotate at a CLV by a spindle motor 52 for driving a disk to rotate at a CLV. Laser light is irradiated from an optical head 53 onto the disk 51 upon recording/playback.

The optical head 53 performs, upon recording, laser outputting of a high level for heating a recording track to a Curie-point, but performs, upon playback, laser outputting of a comparatively low level for detecting data from reflected light by a magnetic Kerr effect. To this end, although detailed description is omitted here, a laser diode serving as laser outputting means, an optical system including a polarizing beam splitter, an objective lens and so forth and a detector for detecting reflected light are incorporated in the optical head 53. The objective lens provided on the optical head 53 is held for displacement in a disk radial direction and a direction toward and away from a disk, for example, by a two-axis mechanism.

Further, a magnetic head 54 is disposed at a position opposing to the optical head 53 across the disk 51. The magnetic head 54 performs an action of applying a magnetic field modulated with recording data to the disk 51.

Further, though not shown, the deck section 5 includes a thread mechanism which is driven by a thread motor 55. As the thread mechanism is driven, the entire optical head 53 and the magnetic head 54 can be moved in a disk radial direction.

An operation section 7 corresponds to the various operation elements shown in FIGS. 6A and 6B, and various operation information of a user by the operation elements is outputted, for example, to the video controller 38.

The video controller 38 supplies control information for causing necessary actions corresponding to operation information outputted from the touch panel 6B described hereinabove and the operation section 7 also described above to be executed by the pertaining sections to the camera controller 25 and the driver controller 46.

An external interface 8 is provided to allow mutual transmission of data between the video camera and an external apparatus, and is provided, for example, between an I/F terminal T3 and the video signal processing section as shown in the figure.

In the present embodiment, the Ethernet generally utilized for a LAN (Local area network) is adopted as the external interface 8. As well known in the art, the Ethernet includes one transmission line and is simple in structure, inexpensive and suitable to construct a LAN or the like. Further, the IP (Internet Protocol) is adopted as a communication protocol where the external interface 8 is ready for the Ethernet. The I/F terminal T3 has a terminal shape corresponding to a connector of a cable ready for the Ethernet.

For example, if the video camera of the present embodiment is connected to a transmission line of the Ethernet through the I/F terminal T3, then it can communicate with a personal computer apparatus or some other digital image apparatus connected to the transmission line to transmit and receive image/sound data and so forth. Further, depending upon the construction, it is possible to remotely control the video camera of the present embodiment from the apparatus connected over the Ethernet.

Although detailed description is omitted here, where, for example, thumbnail image data for thumbnail display is transmitted and outputted to the personal computer apparatus over the transmission line of the Ethernet, in the present embodiment, a thumbnail display image produced as a Web file of the HTML format can be outputted. To this end, also a set (program) for producing data as a Web file according to the HTML format is stored, for example, in the program memory 39.

It is to be noted that, if necessary, the video camera of the present embodiment may additionally have, as an interface for performing transfer of data to and from the outside, another interface such as, for example, an IEEE 1394 interface in addition to the Ethernet described above. In short, in the external interface 8 shown in this figure, a plurality of interface sections of different specifications may be provided in accordance with the number of interface functions provided actually.

A power supply block 9 makes use of dc power supply obtained from a built-in battery or dc power supply produced from commercial ac power supply to supply a power supply voltage of a required level to various functioning circuit sections. Power supply on/off by the power supply block 9 is controlled by a video controller 38 in response to an operation of the main dial 300 described hereinabove.

Further, during recording action, the video controller 38 causes an indicator 206 to execute a light emitting operation.

4. Construction of the Medium Drive Section

Figure 5:
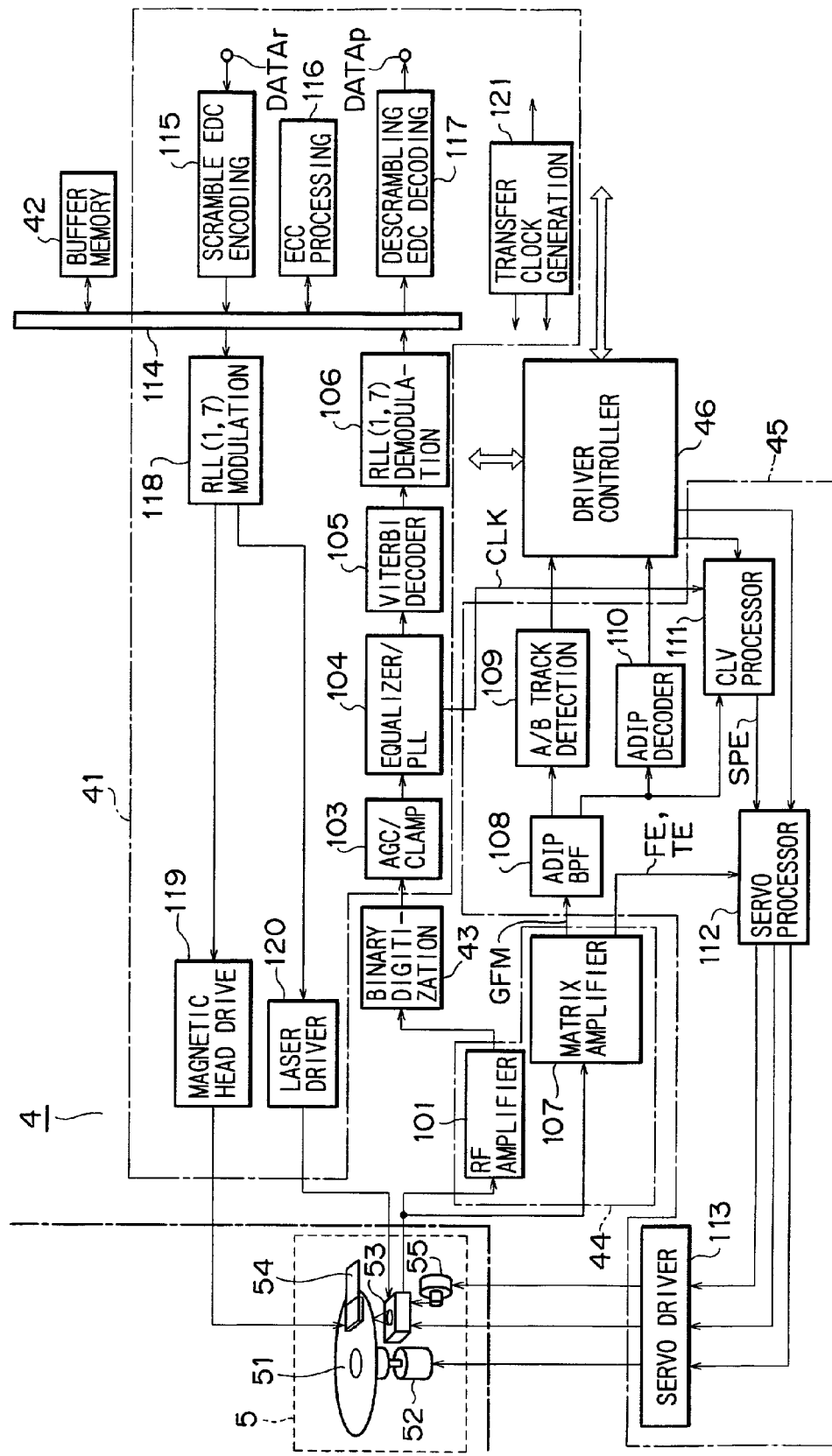
FIG. 5 is a block diagram of an internal construction of a medium drive section of the video camera.

Subsequently, as a construction of the medium drive section 4 shown in FIG. 4, a detailed construction wherein those functioning circuit sections which correspond to the MD-DATA2 are extracted is described with reference to a block diagram of FIG. 5.

Information detected by a data reading out action of the optical head 53 from the disk 51 (photoelectric current obtained by detection of reflected laser light by means of the photo-detector) is supplied to a RF amplifier 101 in the RF signal processing circuit 44.

The RF amplifier 101 produces a playback RF signal as a playback signal from the detection information inputted thereto and supplies the playback RF signal to the binary digitization circuit 43. The binary digitization circuit 43 performs binary digitization of the playback RF signal inputted thereto to obtain a playback RF signal (binary digitized RF signal) in the form of a digital signal.

The binary digitized RF signal is supplied to the MD-DATA2 encoder/decoder 41, in which gain adjustment, clamping processing and so forth are performed for the binary digitized RF signal by an AGC/clamp circuit 103 and a resulting signal is inputted to an equalizer/PLL circuit 104.

The equalizer/PLL circuit 104 performs equalizing processing for the binary digitized RF signal inputted thereto and outputs the equalized binary digitized RF signal to a Viterbi decoder 105. Further, the binary digitized RF signal after the equalizing processing is inputted to a PLL circuit to extract a clock signal CLK synchronized with the binary digitized RF signal (RLL(1, 7) code train).

The frequency of the clock signal CLK corresponds to the rotational speed of the disk at present. Therefore, a CLV processor 111 receives the clock signal CLK from the equalizer/PLL circuit 104 and compares the clock signal CLK with a reference value corresponding to a predetermined CLV velocity (refer to FIG. 3) to obtain error information, and utilizes the error information as a signal component for producing a spindle error signal SPE. Further, the clock signal CLK is used as a clock signal for processing of required signal processing circuit systems including, for example, a RLL(1, 7) demodulation circuit 106.

The Viterbi decoder 105 performs decoding processing in accordance with a so-called Viterbi decoding method for the binary digitized RF signal inputted thereto from the equalizer/PLL circuit 104. Consequently, playback data in the form of a RLL(1, 7) code train are obtained.

The playback data are inputted to the RLL(1, 7) demodulation circuit 106, by which they are converted into a RLL(1, 7) demodulated data stream.

The data stream obtained by the demodulation processing of the RLL(1, 7) demodulation circuit 106 is written into the buffer memory 42 over a data bus 114 and expanded on the buffer memory 42.

The data stream expanded on the buffer memory 42 in this manner is first subject to error correction processing in a unit of an error correction block in accordance with the RS-PC system by an ECC processing circuit 116 and then to descramble processing and EDC decoding processing (error detection processing) by a descrambling/EDC decoding circuit 117.

The data obtained by the processing till then are playback data DATAP. The playback data DATAP are transferred at a transfer rate in accordance with a transfer clock signal generated by a transfer clock generation circuit 121, for example, from the descrambling/EDC decoding circuit 117 to the data processing/system control circuit 31 of the video signal processing circuit section 3.

The transfer clock generation circuit 121 is a member which suitably generates a transfer clock signal (data transfer rate) of an appropriate frequency, for example, from a clock signal of a crystal system when data transfer between the medium drive section 4 and the video signal processing section 3 or data transfer between functioning circuit sections in the medium drive section 4 is to be performed.

Further, the transfer clock generation circuit 121 generates a clock signal of a required frequency to be supplied to various functioning circuit sections of the medium drive section 4 and the video signal processing circuit section 3 in response to an action state of the video camera.

The detection information (photoelectric current) read out from the disk 51 by the optical head 53 is supplied also to a matrix amplifier 107.

The matrix amplifier 107 performs required arithmetic operation processing for the detection information inputted thereto to extract a tracking error signal TE, a focusing error signal FE, groove information (absolute address information recorded as the wobbled groove WG on the disk 51) GFM and so forth and supplies the extracted information to the servo circuit 45. In particular, the tracking error signal TE and the focusing error signal FE extracted are supplied to a servo processor 112, and the groove information GFM is supplied to an ADIP band-pass filter 108.

The groove information GFM band-limited by the ADIP band-pass filter 108 is supplied to an A/B track detection circuit 109, an ADIP decoder 110 and a CLV processor 111.

The A/B track detection circuit 109 performs, for example, based on the system described with reference to FIG. 2B or the like, from the groove information GFM inputted thereto, discrimination of which one of the tracks TR•A and TR•B the track being currently traced is, and outputs the track identification information to the driver controller 46. Meanwhile, the ADIP decoder 110 decodes the groove information GFM inputted thereto to extract an ADIP signal which is absolute address information on the disk, and outputs the ADIP signal to the driver controller 46. The driver controller 46 executes required control processing based on the track discrimination information and the ADIP signal described above.

To the CLV processor 111, the clock signal CLK from the equalizer/PLL circuit 104 and the groove information GFM through the ADIP band-pass filter 108 are inputted. The CLV processor 111 produces a spindle error signal SPE for CLV servo control based on, for example, an error signal obtained by integrating a phase error between the groove information GFM and the clock signal CLK, and outputs the spindle error signal SPE to the servo processor 112. It is to be noted that required action to be executed by the CLV processor 111 is controlled by the driver controller 46.

The servo processor 112 produces various servo control signals (a tracking control signal, a focusing control signal, a thread control signal, a spindle control signal and so forth) based on the tracking error signal TE, focusing error signal FE and spindle error signal SPE inputted thereto in such a manner as described above and a track jump instruction, an access instruction or the like from the driver controller 46, and outputs the servo control signals to a servo driver 113.

The servo driver 113 produces required servo drive signals based on the servo control signals supplied thereto from the servo processor 112. Here, the servo drive signals are two-axis drive signals (two kinds of signals for a focusing direction and a tracking direction) for driving the two-axis mechanism, a thread motor drive signal for driving the thread mechanism and a spindle motor drive signal for driving the spindle motor 52.

As such servo drive signals are supplied to the deck section 5, focusing control and tracking control for the disk 51 and CLV control for the spindle motor 52 are performed.

When a recording operation onto the disk 51 is to be executed, recording data DATAr are inputted, for example, from the data processing/system control circuit 31 of the video signal processing circuit section 3 to a scramble/EDC encoding circuit 115. The user recording data DATAr are inputted, for example, in synchronism with a transfer clock signal (data transfer rate) generated by the transfer clock generation circuit 121.

The scramble/EDC encoding circuit 115, for example, writes and expands the recording data DATAr into and on the buffer memory 42 to perform data scramble processing and EDC encoding processing (processing of adding an error detection code in accordance with a predetermined system) for the recording data DATAr. After this processing, for example, error correction codes in accordance with the RS-PC system are added to the recording data DATAr expanded on the buffer memory 42 by the ECC processing circuit 116.

The recording data DATAr to which such processing as described above has been performed are read out from the buffer memory 42 and supplied to a RLL(1, 7) modulation circuit 118 over the data bus 114.

The RLL(1, 7) modulation circuit 118 performs RLL(1, 7) modulation processing for the recording data DATAr inputted thereto and outputs the recording data in the form of a RLL(1, 7) code train to a drive circuit 119.

By the way, the MD-DATA2 format adopts a so-called laser strobe magnetic field modulation system as a recording system for a disk. The laser strobe magnetic field modulation system is a recording system wherein a magnetic field modulated with recording data is applied to a recording face of a disk and laser light to be irradiated upon the disk is emitted in pulses in synchronism with the recording data.

In such a laser strobe magnetic field modulation system as just described, the process of formation of pit edges recorded on the disk does not rely upon a transient characteristic such as a speed of reversal of the magnetic field, but depends upon an irradiation timing of a laser pulse.

Therefore, in the laser strobe magnetic field modulation system, when compared with, for example, a simple magnetic field modulation system (a system wherein laser light is irradiated constantly upon a disk and a magnetic field modulated with recording data is applied to a recording face of the disk), it is easily possible to make jitters of recording pits very small. In short, the laser strobe magnetic field modulation system is a recording system which is advantageous for high density recording.

The drive circuit 119 of the medium drive section 4 acts such that a magnetic field modulated with the recording data inputted may be applied from the magnetic head 54 to the disk 51. Further, a clock signal synchronized with the recording data is outputted from the RLL(1, 7) modulation circuit 118 to a laser driver 120. The laser driver 120 drives the laser diode of the optical head 53 in response to the clock signal inputted thereto so that a laser pulse synchronized with the recorded data generated as the magnetic field by the magnetic head 54 may be irradiated upon the disk. Thereupon, the laser pulse emitted and outputted from the laser diode is based on required laser power suitable for recording. In this manner, a recording action according to the laser strobe magnetic field modulation system can be performed by the medium drive section 4 of the present embodiment.

5. Example of the Disk Structure Ready for the Disk Player

Subsequently, an example of the data structure of the disk 51 ready for the present embodiment will be described.

First, data units called sector and cluster of the format of the MD-DATA2 are described as a premise.

The sector is a minimum unit upon physical reading out of data from a disk, and a PSA (Physical Sector Address) is allocated to each sector.

Meanwhile, the cluster (Logical Cluster) is a minimum unit upon physical writing of data onto a disk, and a PSA is formed by a set of consecutive 16 sectors from 0h to Fh, and this is also called allocation unit (Allocation Unit). A PCA (Physical Cluster Address) is allocated to each cluster. And, a sector which is in a lead-in area (pre-mastered area) which is hereinafter described can be specified uniquely by the PCA. Further, in clusters which are in a recordable area, a cluster having the same PCA is present one in each of the tracks Tr•A and Tr•B.

A file management system for the format of the MD-DATA2 is described below.

In the format of the MD-DATA2, a TMS (Track Management System) is prescribed as a file management system. The TMS is the most basic rule for recording region allocation of a disk in accordance with the MD-DATA2 format and allows, for example, approximately 5,500 pieces of information to be recorded in a hierarchically classified form.

In the TMS, a track and a folder are defined in order to realize a hierarchical management structure. A track is a minimum unit of a lump of data to be managed directly by the TMS and is a synonym of a file as a rule. Each track is represented by a Track descriptor.

A folder has a structure for managing tracks in groups. Tracks and folders belong to a certain one folder (Parent Folder) and finally construct a tree structure whose root is the Root folder. Each folder is represented by a Folder Descriptor.

Further, ID is given to each track/folder.

Figure 9:
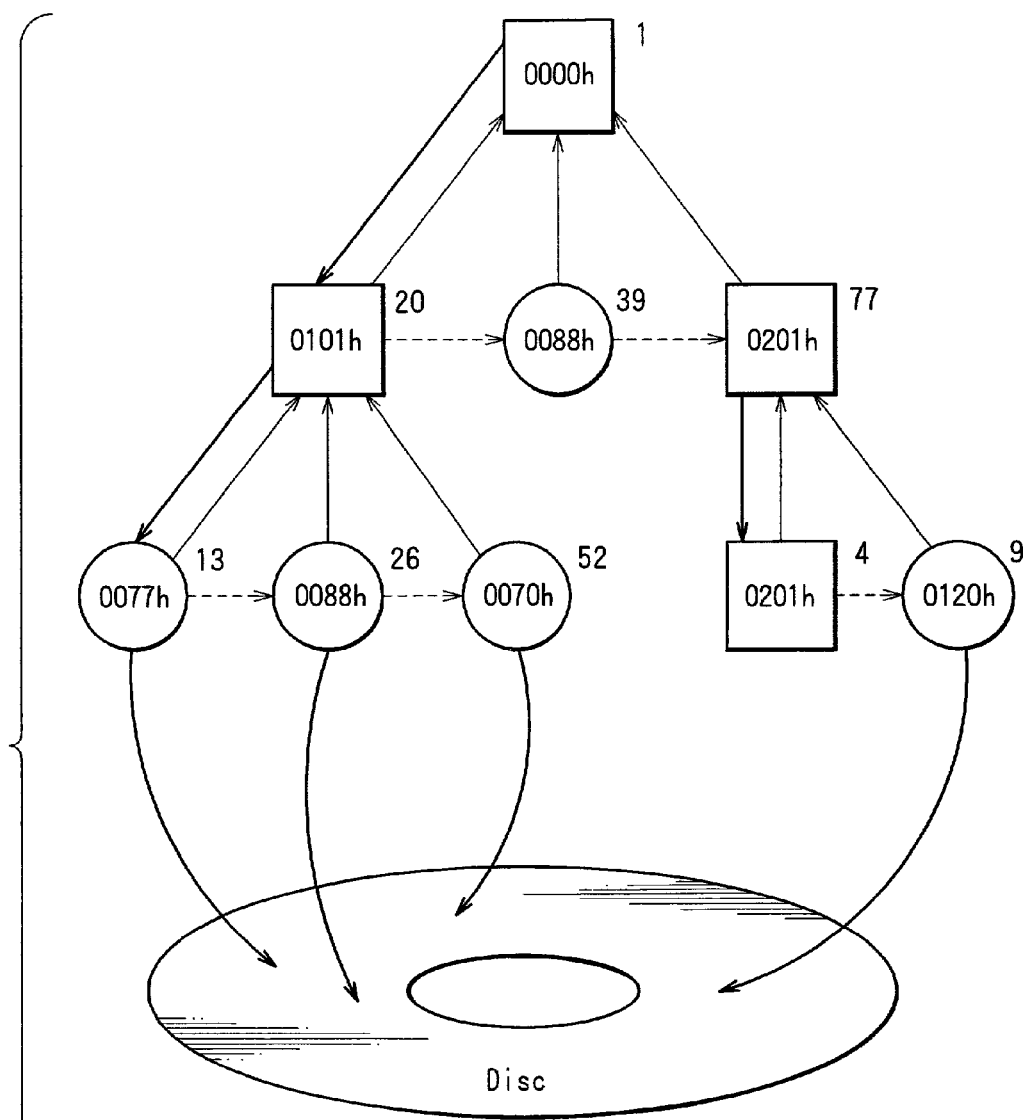
FIG. 9 is a diagrammatic view illustrating an example of file/folder management of the disk by the video camera.

FIG. 9 shows an embodiment of a hierarchical structure under the TMS.

In the TMS, in order to realize a hierarchical folder structure and in order to define a search order of tracks and folders, all tracks and folders are linked by two kinds of links.

One of the links is a link which designates the Parent Folder of a track/folder, and this allows it to be recognized to which folder the track/folder belongs.

The other is a link by which tracks/folders which belong to the top folder, that is, the Parent Folder, are linked in order. This link allows definition of a search order of the tracks/folders in the folder and allows realization of high speed search.

Since all tracks/folders on a disk are placed in a tree structure whose root is the Root folder, each of them can be identified uniquely on the disk based on a folder on a path whose start point is the Root Folder and a permutation of the ID of the track/folder itself.

For example, in the embodiment shown in FIG. 9, the Root Folder has the ID 0000h ("h" indicates that the value is represented in the hexadecimal notation). The Root Folder has three children including a Folder 0101h, a Track 0088h and another Folder 0201h. The three folders/track have an order defined so as to be the Folder 0101h→Track 0088h→Folder 0201h as seen in the figure.

Further, three tracks of a Track 0077h, another Track 0088h and a further Track 0070h belong to the Folder 1010h, and the playback order of the three tracks is defined so as to be the Track 0077h→Track 0088h→Track 0070h.

Further, to the Folder 0201h which is a child of the Root Folder, a Folder 0201h and a Track 0120h belong, and the order of them is the Folder 0201h→Track 0120h.

Here, while the Track 0088h (Descriptor Number=39) under the Root Folder and the Track 0088h (Descriptor Number=26) which belongs to the Folder 0101h have the same ID, as can be seen from the fact that the different Descriptor Numbers from each other are allocated to them, they are regarded as beings independent of each other. This similarly applies to the folders, and in the figure, the Folder 0210h (Descriptor Number=77) which is a child of the Rood Folder and the Folder 0201h (Descriptor Number=4) which is a child of the Folder 0201h correspond to this.

Figure 10:
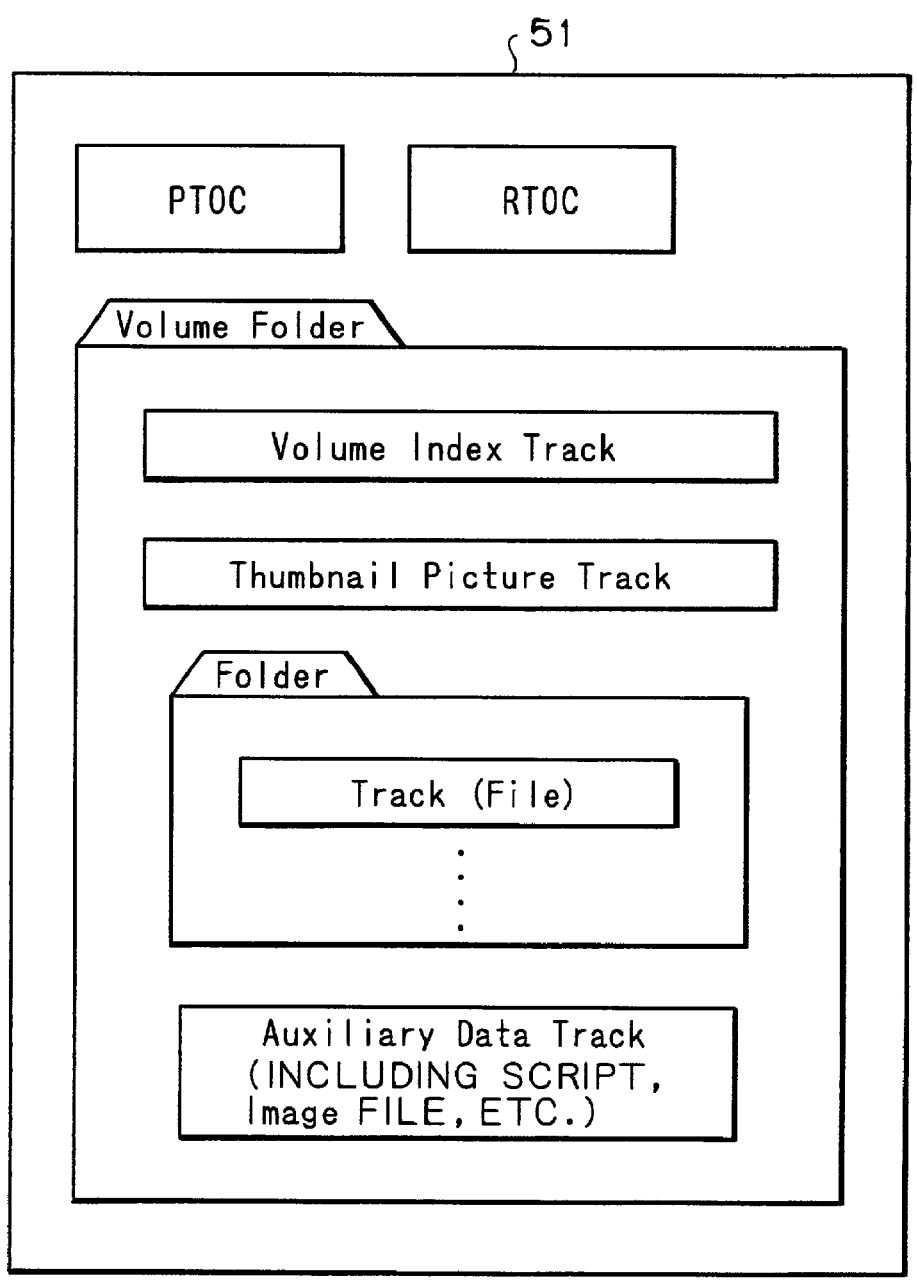
FIG. 10 is a diagrammatic view illustrating a concept of a data structure of the disk ready for the video camera.

FIG. 10 illustrates a concept of a form of data management of the disk 51 ready for the present embodiment. It is to be noted that the physical format of the disk 51 shown in this figure is such as described above with reference to FIGS. 1, 2A and 2B.

In the disk 51, for example, a PTOC and a RTOC are set as management information. The PTOC has required management information recorded in the form of pits therein. The contents of the PTOC cannot be rewritten.

The RTOC has stored therein basic information necessary, for example, to manage data recorded on the disk.

For example, in the case of the present embodiment, as data recorded on the disk, information for managing tracks and folders upon recording and playback is stored.

It is to be noted that, for contents of the RTOC, rewriting is performed at any time, for example, in accordance with a result of recording of data onto the disk till then and a result of editing processing such as deletion of a track (file) or a folder.

User data are managed as a volume folder (Volume Folder) placed in the one root folder. The volume (Volume) in the present embodiment is defined as a complete set of user data, and it is prescribed that only one volume is present for one disk. And, data included in the volume are stored as folders and tracks under the volume folder except those which are managed with the PTOC and the RTOC described above.

In the volume folder, a volume index track (VIT: Volume Index Track) of a predetermined size (for example, 12 clusters) is placed.

The volume index track is prescribed as an area in which, where, for example, main management information is recorded in the PTOC and the RTOC, as it were, sub management information is recorded. The VIT has a table in which information for managing properties regarding tracks (files), folders and auxiliary data (Auxiliary Data), titles and packet data which form the tracks is recorded.

Further, as a track managed in the volume folder, a thumbnail track (Thumbnail Picture Track) can be disposed optionally.

In the present embodiment, the thumbnail track can have one still picture of a predetermined resolution as a thumbnail picture in a corresponding relationship to each of files recorded on a disk. A thumbnail picture is handled as a representative picture for allowing the file to be visibly recognized.

On the thumbnail track, such thumbnail pictures are recorded together with index information which represents a corresponding relationship with the files (tracks) recorded on the disk and stored positions of the thumbnail pictures. The data length of the thumbnail track can be extended arbitrarily in response to the number of thumbnail pictures to be stored and so forth.

Image/sound data recorded, for example, by image picking up by a user are managed in a unit of a file and placed as tracks under the volume file in the volume folder or placed in a folder placed under the volume folder.

In FIG. 10, a state wherein a certain one file is represented as one track and this track is stored in a certain one folder is illustrated. The folder is a structure for managing tracks or folders collectively in one group as described hereinabove.

Accordingly, in a structure under the volume folder, an arbitrary number of tracks or folders are stored within a range which is defined by a maximum number of cases which can be stored in the volume folder and a maximum number of stages of the hierarchical structure of folders.

Further, an auxiliary data track (Auxiliary Data Track) in which auxiliary data (Auxiliary Data) are stored is placed in the volume holder.

The information to be stored in the auxiliary data track is arbitrary depending upon, for example, an application actually applied.

In the present embodiment, script information as playback control information is stored. Further, although detailed description is omitted here, also image data (Image) produced by "scribble editing" to a track (recorded picture file) are stored.

By the way, the PTOC and the RTOC which are management information described above and information stored on the volume index track (also such information is generally referred to as "management information" in the present embodiment) are read out, for example, upon loading of the disk and held in a predetermined area of, for example, the buffer memory 42 of the medium drive section 4 (or the buffer memory 32). Then, upon data recording or upon editing, the management information held in the buffer memory is rewritten in response to a result of the recording or a result of the editing, and thereafter, at a predetermined opportunity and timing, the management information of the disk 51 is rewritten (updated) based on contents of the management information held in the buffer memory (however, updating is not performed with the PTOC).

Figure 11:
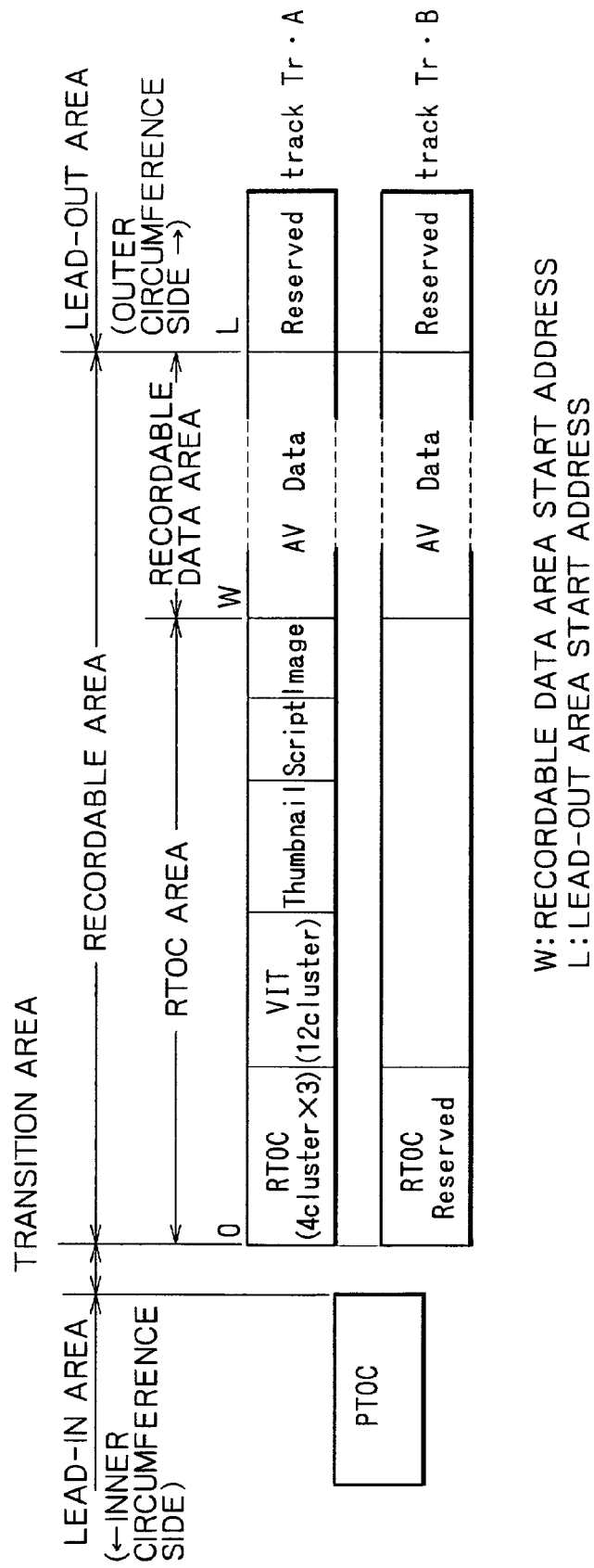
FIG. 11 is a diagrammatic view illustrating a concept of a data structure of the disk ready for the video camera in a corresponding relationship to physical regions of the disk.

FIG. 11 illustrates the data management form described above with reference to FIG. 10 in a corresponding relationship to the physical structure of the disk 51.

A lead-in area shown in this figure is a pit area on the innermost circumference of the disk, and information of the PTOC is stored in this area.

On an outer circumference of the lead-in area, a recordable area is formed with a transition area interposed therebetween. The recordable area is a magneto-optical recording area which allows magneto-optical recording and playback. In the recordable area, the two tracks of the track Tr•A and the track Tr•B are formed on double spirals as described hereinabove with reference to FIGS. 1, 2A and 2B.

On the innermost circumference of the recordable area, a RTOC area is provided for both of the tracks Tr•A and Tr•B. And, in the RTOC area of the track Tr•A, information of the RTOC having a size of four clusters is recorded repetitively by three times. And, following this, the volume index track of a size of 12 clusters is disposed.

Next to the volume index track, a thumbnail track can be disposed optionally. The thumbnail track in the RTOC area is defined such that at least the first one cluster is positioned therein. And, for example, as the file number increases, the thumbnail image data number increases, and if the thumbnail image data number exceeds the capacity of the thumbnail track in the RTOC area, then thumbnail image data can be recorded additionally in the recordable data area which is hereinafter described. Further, the thumbnail track on the recordable data area in this instance is managed by the volume index track (or the RTOC).

Further, next to the thumbnail track of the RTOC area, an area in which scripts which are auxiliary data and image data are recorded can be set optionally.

Further, if also the scripts and the image data exceed the capacity for them which can be recorded in the RTOC area, they can be recorded additionally in the recordable data area in such a form that they are managed by the volume index track (or the RTOC).

The recordable data area is provided beginning with an address position indicated by a recordable data area start address W. AV data, that is, data of tracks (files) can be recorded into the recordable data area. Also the thumbnail image data and auxiliary data described above can be recorded into the recordable data area.

After the recordable data area comes to an end, a lead-out area is formed beginning with an address position indicated by a lead-out area start address L and ending with the outermost circumference.

While the foregoing description relates to the track Tr•A, the area setting for the track Tr•B applies corresponding to that of the track Tr•A as can be seen also from FIG. 11. However, the RTOC area is undefined at present. In short, the RTOC area is used substantially only with regard to the track Tr•A.

It is to be noted that the embodiment of the disk structure shown in FIGS. 10 and 11 is a mere embodiment at all, and the physical positional relationship of the individual areas on the disk may be modified in accordance with conditions of actual use and so forth, and also the structure in which data are stored may be modified.

The AV data stored in the recordable data area described hereinabove with reference to FIG. 11 are formed from a sequence of AV packets. An AV packet is a minimum editing unit of a moving picture, a still picture and sound and places therein audio data (an audio record) and video data (a video record) to be played back simultaneously. It is recommended that one AV packet represents a time of approximately 1 second to 5 seconds although it depends upon the bit rate of data to be stored into the inside. Further, the AV packet is prescribed as being formed, on a disk, from integral allocation units which are continuous not only physically but also logically.

Figure 12A:
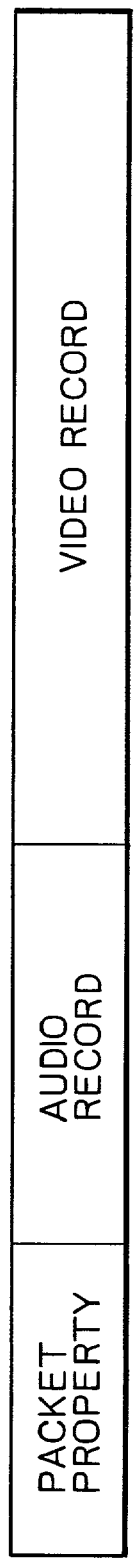
FIGS. 12A and 12B are diagrammatic views illustrating a structure of an AV packet.
Figure 12B:

FIGS. 12A and 12B show a structure of one AV packet. The entire AV packet has a packet property as a header disposed at the top thereof as shown in FIG. 12A.

Although a detailed structure of the packet property is omitted here, various recording conditions regarding the current AV packet are stored in the packet property. The recording conditions here are generated upon picking up and recording of an image and are information which need not be changed later.

Following the packet property, an audio record which is a storage area for audio data is disposed. In the audio record, one or more completed video decode units are recorded as audio data compressed in accordance with the ATRAC 2 system. While, in the present specification, the ATRAC 2 system is described as an example of the compression system for audio data, the compression system is not limited to the specific format, but may be the ATRAC (trademark), ATRAC 3 (trademark), MP3 (MPEG1 Audio layer 3), MPEG-2AAC (Advanced Audio Coding) (trademark), QDesign Music Code (trademark), TwinVQ (Transform-Domain Weighted Interleave Vector Quantization) (trademark), MS audio (Microsoft Audio (WMA: Windows Media Audio)) (trademark), or Ogg Vorbis (trademark).

Following the audio record, a video record (Video Record) in which moving picture data are recorded is disposed. The image data recorded in the video record are data compression coded in accordance with the MPEG 2 and are conceptually formed from a sequence of GOPs in such a manner as seen in FIG. 12B. For example, as specifications, it is recommended that this GOP unit is the video decode unit. In this instance, it is prescribed that one GOP includes 30 Video Frames in the maximum, and it is recommended that, in the video record, one GOP includes 0 to 255 Video Frames. Here, the compression format for video data is not limited to the MPEG 2, but the MPEG 1, MPEG 4 or MPEG 7 may be employed instead.

6. Thumbnail Image Production Process

A thumbnail image to be stored onto a thumbnail track shown in FIGS. 10 and 11 described hereinabove can be produced by the video camera of the present embodiment, and here, a production process for a thumbnail image is described. It is to be noted that the description here relates to a case wherein a thumbnail image for an image file recorded already on a disk is produced.

As described above, management information (the PTOC, RTOC, and volume index track) recorded, for example, on the disk 51 is read out at a predetermined timing such as upon loading of the disk and stored into the buffer memory 42 (or buffer memory 32).

Then, the driver controller 46 refers to the management information stored, for example, in the buffer memory 42 to determine an address on the disk at which image data designated as a thumbnail image in a file for which a thumbnail image is to be produced is recorded, and accesses the address to execute a reading out operation for the disk to obtain image data as a source of production of a thumbnail image.

The image data is successively transmitted from the medium drive section 4 to the video signal processing section 3 and supplied to the data processing/system control circuit 31.

It is to be noted that, if no particular designation is available, image data, for example, of the top frame (or field) in the file is designated as the image data defined as a source of production of a thumbnail image by the management information.

Then, the data processing/system control circuit 31 first controls the MPEG2 video signal processing circuit 33 to perform a decompression process for the screen data supplied thereto in accordance with the MPEG2 format to acquire data decoded to the level of image data of a field image unit.

For example, in the stage of image data decoded to the level of the field image unit described above, normally the image data are data having an image size (pixel number) with which they are displayed substantially in a full size with respect to the display screen.

Thus, after the image data of the full size of the field image unit described above are obtained, reduction processing is performed for the image data of the full size to thus perform a process so that an actually required size of a thumbnail image may be obtained.

In order to perform such reduction of the image size, signal processing should be executed such that, for example, sampling of image data of the original full size is performed at an appropriate timing and image data are re-constructed with the image data obtained by the sampling.

Then, for example, the video controller 38 executes control so as to produce index information (described with reference to FIG. 10) regarding the thumbnail image data obtained in this manner and record the thumbnail image data together with the index information into the thumbnail track of the disk.

Thumbnail image data corresponding to each file are obtained and recorded onto a disk in such a manner as just described.

It is to be noted that, while, in the present embodiment, as can be recognized from the foregoing description, not only image data (including sound data) but also sound data only of sound, character information data and so forth can be recorded as a file, for example, where a file does not include image data which may make a source of production of a thumbnail image such as a file of sound data or character information data, for example, image data of a design pattern which can be visually recognized as sound data or character information data are prepared in advance (should be stored, for example, in a ROM of the video controller 38 or in a predetermined region of a disk) and should be utilized as a thumbnail image.

7. Script

Further, in the present embodiment, such editing processing as designation of a playback order or provision of a required special effect upon playback of files (principally recorded picture files) recorded by the video camera can be performed.

In order to perform such editing as described above, in the present embodiment, a script as playback control information which can provide a required playback outputting form to a recorded picture file is prepared, and in the video camera, for example, the video controller 38 interprets the script to obtain a playback outputting form (for example, a playback order) in accordance with a result of editing. Further, the video camera is constructed such that, in the editing stage, contents of the script are updated to execute editing processing. It is to be noted that the "script" here signifies a hand-written structure described in a predetermined program language in order to play back and output moving picture data, still picture data, sound data, document data and so forth at the same timing.

Thus, the script which is utilized as playback control information in the present embodiment is first described generally.

In the present embodiment, the SMIL (Synchronized Multimedia Integration Language) is adopted as the script.

The SMIL is a language standardized by the W3C (World Wide Web Consortium: a standardization organization of the Internet) for realizing, for example, television broadcasting, presentation and so forth on the Internet and realizes time-series presentation and so forth based on the grammar of the XML(Extensible Markup Language: a superset of HTML (Hyper Text Markup Langauge)).

First, scheduling is represented by two tags of <seq> and <par>.

<seq> signifies "sequential", that is, "serial", and information placed between the tags is played back in order of time.

<par> signifies "parallel", and information placed between the tags is played back in synchronism with each other.

Here, for example, where files are recorded on a disk, if it is designated that the files of image data represented as video1, video2 and video3 should be played back in the order of video1→video2→video3, this is described as

```
<seq>
    <video src = "video1">
    <video src = "video2">
    <video src = "video3">
</seq>
or
<seq>
    <play video1>
    <play video2>
    <play video3>
</seq>
```

On the other hand, if it is intended to play back the files video1, video2 and video3 in order of video1→video2→video3 and play back a sound data file audio1 as an after recording track simultaneously with the file video1, this is described as

```
<seq>
    <par>
        <video src = "video1">
        <audio src = "audio1">
    </par>
    <video src = "video2">
    <video src = "video3">
</seq>
```

Also a description is prepared for designating that a file to be played back in synchronism with a certain file should be played back from the position after some seconds after the certain file is played back.

For example, if it is intended to display a caption (for example, an image as character information) after five seconds after the image file video1 is displayed (played back), this is described as

```
<par>
    <video src = "video1">
    <image src = "scratch1" begin = "5s">
</par>
```

Further, if it is intended to designate that, for example, a file picture1 as a still picture file should be displayed for 5 seconds, then this is described as <image src="picture1" dur="5s">

Further, if it is intended to pick out and play back part of a certain moving picture file called frame mute, then "range"

is utilized. For example, where the standards of the SMPTE (Society of Motion Picture and Television) are adopted are used as a time code, this can be described as <video src="video1"range="smpte:10:07:00–10:07:33">

Furthermore, in order to designate and repeat a certain file, "repeat" is utilized. For example, if it is intended to repeat the file video1 ten times, then this is described as <video src="video1"repeat="10">

The present embodiment is constructed such that such a script called SMIL as described above is utilized so that display control for providing a required display form to a thumbnail display can be executed.

To this end, for example, in the video camera system of the present embodiment, a subset of the XML is prepared so that interpretation conforming with the SMIL and description (production) of a script can be performed. The sub set of the XML may be, for example, stored as a program to be executed by the video controller 38 into the program memory 39 or the like in advance or recorded into an application layer of a disk so that it can be read out.

In the present embodiment, such a script as described above is produced or updated by the video controller 38, for example, in an editing stage (or in a stage wherein a picture recording operation is performed) and stored into a predetermined area of, for example, the buffer memory 32.

Then, the script stored in the buffer memory 32 in this manner is recorded onto the disk in a predetermined opportunity or at a predetermined timing. Data of the script are stored as a script file onto the auxiliary data track described with reference to FIGS. 10 and 11. Since the script is recorded on the disk in this manner, when the disk is newly loaded later, if the script recorded on the disk is read out and stored, for example, into the buffer memory 32 so as to be referred to, editing, playback or the like can be performed in accordance with a playback order obtained by the previous editing.

8. Operation Screen Display

In the video camera of the present embodiment, when search for a file recorded on a disk, various editing operations or setting processes are performed, an operation screen is displayed on the display panel section 67.

The operation screen presents various kinds of information of a disk currently loaded, files recorded on the disk and so forth. Various operations for a certain object are realized through use of both of a depressing operation (hereinafter referred to as pointing operation) for the operation screen and operations for various operation elements.

Here, the operation screen of the present embodiment can perform thumbnail display of presenting thumbnail images (small images) corresponding to individual files recorded on a disk currently loaded. That is to say, the user can visually confirm contents of the files (tracks) recorded on the disk by looking at the thumbnail images displayed on the operation screen. Further, by an operation for the thumbnail images, search, playback or the like of a file can be performed.

FIG. 13 shows a display form of the operation screen displayed on the display panel section 67 of the video camera of the present embodiment.

This operation screen is displayed as an initial screen, for example, when a playback/editing mode is established in a state wherein a disk is loaded.

First in FIG. 13, in the top stage of the display region, an information display area A1 is provided. In the information display area A1, various kinds of information necessary to the user are displayed. A battery remaining amount display area A1-1, a sport mode display area A1-2, a playback mode display area A1-3, a recording remaining time display area A1-4 and a disk icon A1-5 are disposed in the information display area A1.

In the battery remaining amount display area A1-1, a battery remaining amount is indicated by a symbol of a battery and time.

Although detailed description is omitted here, the video camera of the present embodiment can set, as a playback mode, a sport mode wherein, for example, frame by frame feeding playback or the like is performed to allow confirmation of movements of motion of an image pickup object or the like picked up by the user. If the sport mode is set, then the sport mode display area A1-2 displays, for example, the characters "SPORTS" as seen in the figure to inform that the sport mode is currently set.

In the playback mode display area A1-3, various special playback modes such as, for example, shuffle playback, repeat playback, and playback between A and B are presented using characters, a symbol or the like.

In the recording remaining time display area A1-4, a remaining capacity for recording of the disk is indicated in the form of time.

The disk icon A1-5 is displayed, for example, when a disk is loaded, and if a pointing operation is performed for the disk icon A1-5, then the screen display can be switched from the operation screen shown in the figure to a display of a disk information screen on which various kinds of information regarding the disk currently loaded are displayed.

Below the information display area A1, a thumbnail display area A2 is provided. Here, nine thumbnail images (for 9 files) in the maximum can be displayed, and here, a state wherein thumbnail images SN of A to I are displayed is shown. Though not shown here, for example, actually as each thumbnail image SN, for example, if the file is a recorded picture file, then an image extracted from the recorded picture file is displayed as a still picture.

Further, the order of arrangement of the thumbnail images SN in accordance with the alphabetical order of A to I here is basically in accordance with the playback order. In other words, in the present embodiment, thumbnail images can be displayed in a predetermined order of arrangement in accordance with a file playback order designated by a script. However, if an operation such as sorting is performed, then the thumbnails are displayed in the sorted order.

In this instance, while the number of thumbnail images which can be displayed at a time is nine, for example, where the number of tracks (files) recorded on a disk is greater than nine and accordingly also the number of thumbnail images is greater than nine, if pointing is performed and, for example, a dragging operation is performed for a scroll bar A4 displayed on the right-hand side of the thumbnail display area A2, then those thumbnail images displayed in the thumbnail display area A2 can be scrolled to display all of the thumbnail images.

On the thumbnail images SN displayed in the thumbnail display area A2, various kinds of icons are displayed in an overlapping relationship.

The icons include a moving picture icon i1 which indicates that a file corresponding to the thumbnail image on which the icon is displayed in an overlapping relationship is a file in which moving pictures are recorded. In the case of FIG. 13, it is confirmed that the thumbnail images A, B, C, D, and E are moving picture files.

The icon displayed on the thumbnail image G is a still picture icon i2, and it is indicated by the icon that the corresponding file is a still picture file.

An interview file icon i3 is displayed on the thumbnail image H, and it is indicated by the interview file icon i3 that the corresponding file is an interview file recorded in the interview mode described hereinabove.

While the interview mode is described hereinabove, this is described for confirmation again. The interview mode is a mode in which sound is principally recorded and, at an arbitrary timing, an image being picked up then is recorded as a still picture. Accordingly, the interview file is used as a file wherein still picture data are incidental to sound data. Further, in the interview file, an outputting timing of the still picture data with respect to advancing time of playback of the sound data is defined in accordance with the timing upon recording. Then, for example, actually for the thumbnail image H as an interview file, one of still picture data recorded incidentally to sound data is selected and displayed as a reduced image.

By the way, if still picture recording is not performed when recording is performed in the interview mode, then no still picture data is incidental to the interview file. In short, the interview file includes only sound data.

For example, if the thumbnail image H described above corresponds to such an interview file which includes only sound data as just described, then though not shown, the interview file icon i3 having a predetermined increased size is displayed in place of a reduced image of the still picture.

A group icon i4 is displayed on the thumbnail image I. The video camera of the present embodiment can form a plurality of files successive in the playback order collectively into a group as management on the thumbnail display and can display the plurality of files having been converted into groups in this manner as a single thumbnail image. The group icon i4 is displayed in an overlapping relationship with the thumbnail image obtained by the grouping in this manner.

A memo file icon i5 is displayed on the thumbnail image F. The video camera of the present embodiment can produce contents written as a memorandum by a user as a single independent file. If such a memo file as just mentioned is, for example, inserted forwardly of and displayed together with an arbitrary file, then contents of the file which may be considered as a title can be displayed through the memory file. The memo file icon i5 indicates that the file is a memo file.

An icon displayed, for example, on the thumbnail images C and E and imitating a pencil is a scribble icon i6. As an editing function of the video camera of the present embodiment, it is possible to add a scribble-like image to an image file recorded already by a pasting operation or the like of an operation locus on the display panel section 67 performed by the user using the pen 320 or the like, a stamp image or the like.

The scribble icon i6 indicates that the file has been scribbled by the scribble function.

A mark icon i7 is displayed on the thumbnail images B and E. The user can perform a predetermined operation for the operation screen to apply a mark to an arbitrary file. For example, the user may apply a mark to a file which is significant to the user so as to remember this fact from the mark. The mark icon i7 indicates that this mark is applied to the file.

A lock icon i8 is displayed on the thumbnail images A and E. The user can perform a predetermined operation for the operation screen to set "lock" so as to inhibit such alteration as deletion and editing to an arbitrary file. The lock icon i8 indicates that the file is in a locked state.

Further, an effect icon i9 is displayed below the thumbnail images A and E. In the present embodiment, it is possible to provide special playback effects such as, for example, various kinds of scene-changes and mosaic to files, and the effect icon i9 indicates that the file has one of such special effects given thereto.

In the present embodiment, by displaying various kinds of icons in an overlapping relationship with thumbnail images in this manner, it is possible to cause the user to visually recognize various attributes such as types of files to which the thumbnail images correspond and various setting situations.

A pointer icon i10 which is displayed in such a manner as to rim an image of the thumbnail image E is moved and displayed, for example, if the user performs a pointing operation on another thumbnail image by means of the pen 320 or the like, with respect to the thumbnail image of the object of the pointing operation. The thumbnail image on which the pointer icon i10 is disposed and displayed is a currently selected thumbnail.

Actually on the operation screen of the present embodiment, no icon is displayed in an overlapping relationship on any thumbnail image on which the pointer icon i10 is not disposed, and when the pointer icon i10 is disposed to select the thumbnail image, an icon is displayed in an overlapping relationship with the thumbnail image.

Then, for example, if the user operates the playback/pause key 308 while the pointer icon i10 is disposed on a desired thumbnail image, then playback is started from the file which is selected with the pointer icon i10 disposed thereon. Further, if a pointing operation is performed again for a thumbnail image on which the pointer icon i10 is displayed in an overlapping relationship, then playback is started from a track on which the pointer icon i10 is disposed.

A menu key area A3 in which various menu keys are displayed is provided on the left-hand side of the thumbnail display area A2.

In the menu key area A3, a playback menu key A3-1, an edit menu key A3-2, a scribble effect menu key A3-3, a studio menu key A3-4, a setting menu key A3-5 and an advanced menu key A3-6 are disposed and displayed in order from above.

The playback menu key A3-1 is used as a key for presenting a menu relating to various kinds of playback and performing setting, and, for example, a playback mode which is reflected on the playback mode display area A1-3 can be set.

The edit menu key A3-2 causes presentation of various items relating to editing in a unit of a recorded file and allows, for example, movement, copying or deletion of a track (file), track division, grouping of files and extraction of a still picture (for example, selection of a still picture to be displayed as a thumbnail image) to be performed. Also an operation for presenting track information and switching to a track information screen on which various settings can be performed regarding information of each track can be performed using the edit menu key A3-2.

The scribble effect menu key A3-3 is used to present a menu for performing a scribble function and setting various special playback effects such as a scene-change (fade-in, fade-out, wipe and so forth), a special sound effect or a special image effect (mosaic and sepia processing).

Further, the video camera of the present embodiment has a function for producing a video work simply and readily through image recording and operations performed in accordance with a GUI by the user. The studio menu key A3-4 can be used to present a menu for such a simple video work production function as just described.

The setting menu key A3-5 is used to present a menu for performing various setting operations, for example, for the brightness of the screen of the display section 6A, the density of the panel color, the brightness of the viewfinder, setting of the date and hour and a still picture setting time.

The advanced menu key A3-6 is used to present a menu regarding, for example, a connection function to an external apparatus such as a personal computer, a demonstration mode and so forth.

A track information display area A5 is provided in a lower stage to the display region. In the track information display area A5, information regarding a track to which a thumbnail image selected (having the pointer icon i10 disposed thereon) in the thumbnail display area A2 is displayed.

Here, a track number is first indicated in a track number display area A5-1, and in a date and hour/title display area A5-2, a recording date and hour and a title applied to the track is displayed alternately after each predetermined time (for example, several seconds). A total time of the track is displayed in a time display area A5-3.

In a shortcut icon A5-4, one of the various icons described hereinabove (for example, the moving picture icon i1, still picture icon i2, interview file icon i3, group icon i4 and memo file icon i5) is displayed in response to the type of a file to which the selected thumbnail image corresponds, whether or not grouping setting is present, and so forth. If a pointing operation is performed for the shortcut icon A5-4, then a track information screen is switchably displayed.

Here, as an operation for the menu area A3 is described with reference to FIG. 14 taking a case of the playback menu key A3-1.

For example, if it is assumed that a pointing operation is performed for the playback menu key A3-1 using, for example, the pen 320 in such a manner as seen, for example, in FIG. 1, then a first popup menu is displayed. In this instance, menu items of "→Return", "Sport analysis mode", "Play mode" and "Sort" are display in the first popup menu. If, for example, the jog dial 303 is rotationally operated (or a dragging operation on the screen by means of a pen or the like may be performed) in a state wherein the first popup menu is displayed, then the item to be selected moves in response to the direction of the rotation. Then, if, for example, the "Play mode" is selected as seen in the figure and the jog dial 303 is operated to be depressed (or a pointing operation for more than a fixed time by means of a pen may be performed), then a second popup menu is displayed.

In the second popup menu, four items of "Normal", "Disk repeat", "Shuffle" and "Introduction scan" are displayed. If the user performs an operation on the second popup menu similar to the operation for the first popup menu described hereinabove, then a desired one of the items can be selected and determined. The play mode set in this manner is reflected on the display contents of the playback mode display area shown, for example, in FIG. 13.

9. File Division Editing 9-1. File Division Editing Operation

In the video camera of the present embodiment, a file recorded already on a disk can be divided at an arbitrary position into two files (tracks) by a GUI operation for the operation screen described hereinabove with reference to FIG. 13. Thus, an operation procedure for the track division will be described with reference to FIGS. 15 and 16A to 16D.

In order to perform division editing, the user performs a pointing operation for the edit menu key A3-2 displayed on the operation screen. Consequently, the first popup menu in which various menu items for editing are disposed as seen in FIG. 15 is displayed. Then, if the user performs an operation for selecting the menu item of "Track division" in the first popup menu, then the second popup menu wherein menu items below the hierarchy of the menu of "Track division" are disposed is displayed. Then, if the menu item written as "Division" displayed in the second popup menu is selected and determined, then the video camera of the present embodiment enters a track division mode for track (file) division.

Figure 16A:
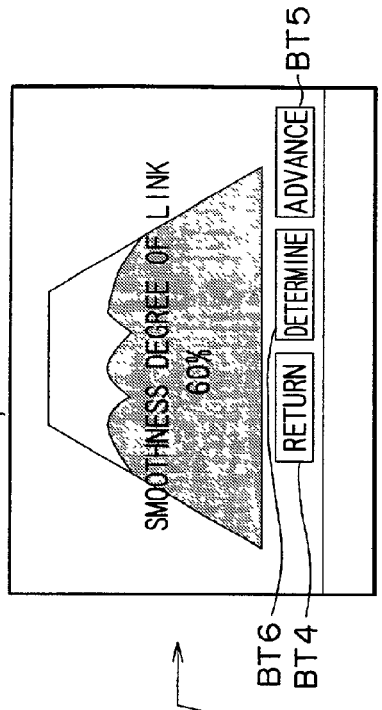
FIGS. 16A to 16D are schematic views illustrating an operation procedure in the track division mode through a display form of a display panel section.

In the track division mode, the display panel section 67 first changes its display from the operation screen display till then first to a track selection screen shown in FIG. 16A. On the track selection screen, a plurality of thumbnail images SN of tracks as files are displayed. The thumbnail display region in which the thumbnail images SN are displayed can be moved, for example, in an upward or downward direction by performing an operation for the scroll bar A4. Then, the user performs, for example, a pointing operation or the like to select a file to be divided. It is to be noted that, if an operation is performed for a stop button BT1 displayed at the right lower corner of the screen, then the track division mode is stopped and the operation screen is back.

Figure 16C:
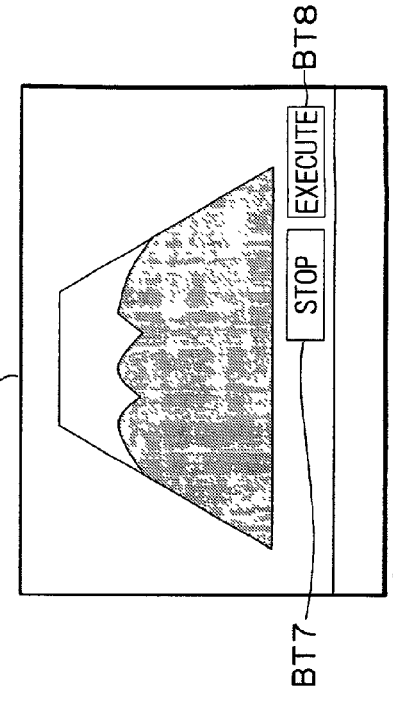
Figure 16B:
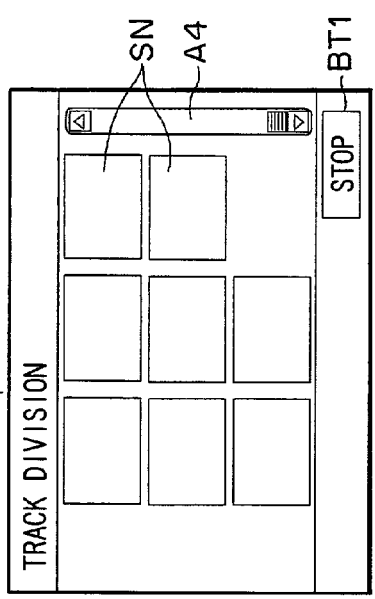

If a file to be divided is selected and determined by an operation for the track selection screen shown in FIG. 16A described above, then a selected track playback screen shown in FIG. 16B is switchably displayed.

On the selected track playback screen, the file selected as an object of division is repetitively played back and displayed. The user performs an operation for pause such as to operate, for example, a pause button BT3 displayed at the right lower portion of the screen at an arbitrary timing for division while observing the image being played back and displayed. Further, if the user operates the stop button BT2, then, for example, the track selection screen shown in FIG. 16A preceding by one stage can be restored.

If the pause operation is performed in such a manner as described above, then the display of the display panel section 67 changes to a pause screen shown in FIG. 16C. The pause screen is a screen for allowing the user to confirm whether or not the dividing position is appropriate as hereinafter described and allowing the user to perform adjustment of the dividing position.

On the pause screen shown in FIG. 16C, a frame image which was displayed when the pause operation was performed is first displayed in a stationary state. Then, particularly in the video camera of the present embodiment, overlapping display is performed with a "smoothness degree of link: 60%". Although it is hereinafter described what the "smoothness degree of link" is, this indicates the degree of the waiting time until, when a frame image currently displayed is determined as a dividing position, the latter file produced by the division begins to be played back and outputted as an image.

Although particulars are hereinafter described, if division editing is performed for a file of moving picture data, when the video camera of the present embodiment plays back a file obtained by the division editing, time of a certain degree is sometimes required before playback and outputting of an image of the latter file obtained by the division is started as a playback state. Then, for a time until the playback and outputting is started, no playback image is displayed, and this time provides waiting time for the user.

This waiting time arises from the fact that such a recording format of the present embodiment as indicated as an AV packet in FIGS. 12A and 12B is used. The waiting time varies depending upon the GOP at what position of a video record in an AV packet the frame image data including the designated dividing position is and varies depending also upon what frame image in the GOP is selected as the dividing position. Therefore, the waiting time is not fixed.

It is to be noted that, in the present specification, such waiting time till starting of playback and outputting of a file is referred to also as "playback standby time".

Thus, in the present embodiment, when the pause screen is displayed, display which can indicate the "playback standby time" is performed on the pause screen. Consequently, the user can known in advance, for example, how long, with the dividing position set by the user, playback and outputting of the file obtained by the division is delayed. Consequently, for example, even if a certain time is required until playback and outputting of a file is started as a result of division editing of a file, since the user has recognized and understood this already, the user does not feel anxiety upon playback and can go without feeling the stress very much.

In the present embodiment, the "playback standby time" is indicated as a ratio of the "smoothness degree of link".

For example, when playback of a certain file comes to an end and playback of the latter file obtained by division editing is to be started, a break between images corresponding to the "playback standby time" appears and the smoothness in playback and outputting between the files is damaged by the break. The "smoothness degree of link" here signifies a degree state of the break between images.

Here, for example, the smoothness degree of link is set such that it is 100% when the "playback standby time" is in the minimum and playback and outputting of the latter file obtained by the division is performed most smoothly, and the ratio as the smoothness degree is gradually decreased in accordance with a longer playback standby time with reference to 100%. In short, if the "playback standby time" of the latter file obtained by the division editing is short, then the smoothness degree is high, but if the "playback standby time" is long, then the smoothness degree is low.

Where the "playback standby time" is represented with such a "smoothness degree of link" as described above, an actual playback standby time can be conveyed more plainly to the user than in an alternative case wherein, for example, the actual playback standby time is merely displayed.

On the pause screen shown in FIG. 16C, it is possible to change the dividing position so as to advance or return, for example, in a unit of a frame image from a start point given by the frame image position currently selected as the dividing position by performing an operation for a "return" button BT4 or an "advance" button BT5 displayed at the lower portion of the screen.

Then, if the dividing position is changed by this operation, then also the smoothness degree indicative of the playback standby time is changed and displayed in response to the changed dividing position on all such occasions.

Consequently, the user can perform fine adjustment for the dividing position set, for example, by a pause operation first. Then, by observing the display of the smoothness degree displayed then, for example, it is possible to select a frame image, with which a smoothness degree desirable to the user can be obtained, as the dividing position. More specifically, it is possible that, if it is desired to make the link between the former file and the latter file obtained by division as smooth as possible, then a frame image with which the smoothness degree is as nearer to 100% as possible is selected.

Then, for example, if the user operates a determination button BT6 displayed between the "return" button BT4 and the "advance" button BT5, then the dividing position set corresponding to the frame image displayed in a pause state upon the operation of the determination button BT6 is determined as a final dividing position candidate. Then, the screen switchably changes to a division execution screen shown in FIG. 16D.

Figure 16D:
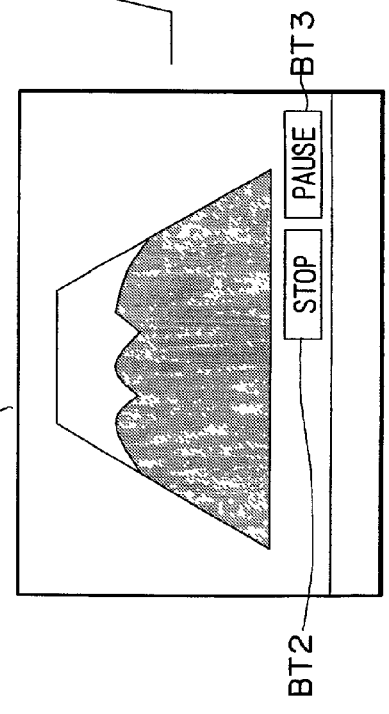

The division execution screen of FIG. 16D is used as a screen for confirmation of a final dividing position. On the division execution screen, a frame image displayed in a pause state upon operation of the determination button BT6 is displayed continuously and a stop button BT7 and an execution button BT8 are displayed, for example, at a right lower portion of the screen as seen in the figure.

Here, if the stop button BT7 is operated, then the video camera of the present embodiment stops, for example, the track division mode. On the other hand, if an operation for the execution button BT8 is performed, then the division editing process with the dividing position currently selected is executed. In short, settlement of the dividing position is performed.

9-2. Playback Process

As described hereinabove as well, in the video camera of the present embodiment, when playback and editing of a file recorded on a disk is performed, a script is used for the playback control and the playback management.

Also when division editing of a file is performed in such a manner as described above, a result of the editing is described as a script. Then, in later playback or editing, analysis of the script allows divided files originally in the form of a single file to be handled as, for example, two independent files.

As an example of a script for division editing, a case wherein three files including moving picture files A, B and C are recorded on a disk and division editing is performed for the moving picture file C from among the three files is described below.

First, it is assumed that described contents of the script before the division editing are <VIDEO SRC=A>

<VIDEO SRC=B>

<VIDEO SRC=C>

This defines that the moving picture file A is played back through an analysis of the first line of the script, and then the moving picture file B is played back through an analysis of the second line, whereafter the moving picture file C is played back through an analysis of the following third line. In short, it is defined that the three moving picture files A, B and C are managed as a single independent track and are played back in the playback order of the moving picture files A→B→C.

Then, it is assumed that, in a state wherein the data are recorded and the script is described in such a manner as described above, division editing is performed for the moving picture file C in accordance with the operation procedure described hereinabove. By the division editing, the contents of the script described above are re-written, for example, in such a manner as given below.

<VIDEO SRC=A>

<VIDEO SRC=B>

<VIDEO SRC=C ENDFRAME=149>

<VIDEO SRC=C BEGINFRAME=150>

The third and fourth lines of the script describe that, in accordance with the designation that the division designation position upon division editing is the 150th frame of the moving picture file C, the moving picture file C which originally is a single file is divided into and managed as two files including a preceding file (track) which includes images from the first frame to the 149th frame of the moving picture file C and a succeeding file (track) which includes images from the 150th frame to the last frame.

As a result, the moving picture files A, B and C are managed as four files whose playback order is designated as the moving picture file A→the moving picture file B→the preceding side of the moving picture file C (up to the 149th frame)→the succeeding side of the moving picture file C (beginning with the 150th frame).

The frame designated as the dividing position is not necessarily the top of a GOP placed in a video record of an AV packet. In other words, the frame may be arbitrary frame image data in a GOP placed in a certain video record.

In this manner, in the present embodiment, a division editing result is obtained by designation of a dividing position of a file through description of a script, and data processing of actually dividing data recorded on a disk is not performed. Consequently, for example, the processing burden by division editing is moderated, and deterioration of main data recorded on the disk is prevented.

It is to be noted that, in the example of the script described above, upon designation of a dividing position, the number of a frame (frame number) of a moving picture file before division is designated, and also the following description proceeds on the premise that a dividing position is designated with a frame number. However, designation of a dividing position is not limited to this, but actually, for example, a dividing position may be designated with a time code.

Figure 17:
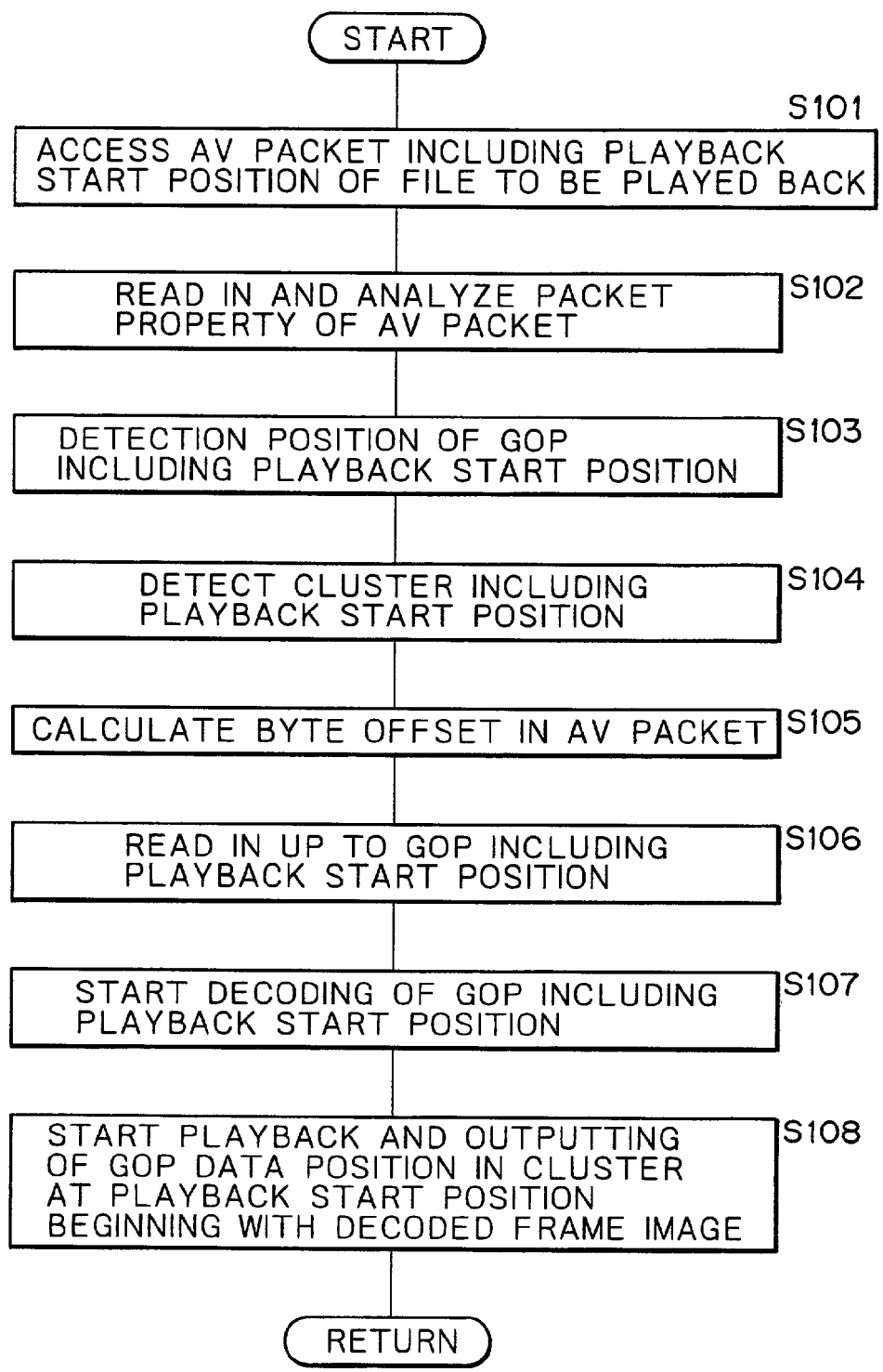
FIG. 17 is a flowchart illustrating a playback process of a division edited file.

FIG. 17 illustrates processing operation for playing back the latter file obtained by division editing as a playback process in accordance with interpretation of a script. The playback process is, for example, a playback process when the fourth line (<VIDEO SRC=C BEGINFRAME=150>) of the script after the division editing given hereinabove is interpreted.

It is to be noted that the process illustrated in this figure is realized, for example, as the video controller 38 functions as a master controller and, when necessary, the data processing/system control circuit 31, driver controller 46 or the like executes control processing.

If, for example, the video controller 38 reads in and interprets the script which indicates playback of the latter file obtained by division, then the processing advances to step S101.

In step S101, an AV packet including a playback start position of a file to be played back, that is, a division designating position is accessed. Then, in next step S102, the packet property of the AV packet is read in and contents of the packet property are analyzed.

Although detailed description is omitted here, from the contents of the packet property, a GOP in the video record including the playback start position in the AV packet can be identified. Thus, in step S103, the position of the GOP including the playback start position in the AV packet is detected based on a result of the analysis of the packet property.

In next step S104, also a cluster (allocation unit) including the playback start position is detected. The cluster is a data unit prescribed as a minimum unit in physical data writing onto a disk in the disk format of the present embodiment as described hereinabove as well, and here, for example, actually a PCA (Physical Cluster Address) of the cluster including the playback start position is detected.

After the processing described is completed, the video controller 38 calculates a byte offset up to the GOP including the playback start position in the AV packet in step S105.

The byte offset here is represented by the number of bytes from the start position to the GOP of the current AV packet as seen from FIG. 18. The byte offset can be determined by addition of the size of the packet property, the size of the audio record and the number of bytes up to the GOP position including the playback start position in the video record based on the contents of the packet property.

Then in next step S106, the AV packet up to the GOP including the playback start position is read in based on the value of the byte offset up to the GOP including the playback start position obtained in step S105 described above. Then, after the reading in up to the GOP of the playback start position is completed, the processing advances to step S107.

In step S107, decoding of the GOP including the playback start position is started. Then, if decoding of the GOP data (frame image data) positioned at the cluster of the playback start position is performed in the process of execution of the decoding of the GOP, then as indicated as a process in step S108, playback and outputting of an image is started from the frame image data obtained by decoding the decoding GOP data. In short, moving picture display on the display panel section 67 is started.

While, in the present embodiment, data up to a GOP which includes a playback start position are read in in accordance with the value of the byte offset, alternatively a cluster on the disk which includes the playback start position may be accessed directly by the optical head 53 based on the cluster. In this instance, the playback standby time is calculated from a reading out time of the AV packet, a top cluster address of the GOP including the playback start position detected from the AV packet, an access time required for the optical head to access the top cluster address, and a reading out time required to read out the accessed GOP.

9-3. Playback Standby Time

That the playback processing procedure of the latter file obtained by division becomes such as illustrated in FIG. 17 originates from the fact that moving picture data are formed by placing GOPs into an AV packet.

According to such a playback process, as described above as well, there is the possibility that some time is required before a playback request is obtained and playback and outputting of a file as an image is started finally. In short, a "playback standby time" may possibly occur.

In the present embodiment, upon file division editing, display which can represent the playback standby time is performed in such a manner as illustrated in FIG. 16C as well. To this end, it is necessary to calculate the playback standby time in response to a designated dividing position.

In the present embodiment, calculation of the playback standby time can be performed, for example, in the following manner.

Here, it can be considered that the playback standby time before playback and outputting of the latter file obtained by division editing is composed of two factors.

One of the factors is a period of time required to read in an AV packet up to a GOP including the dividing designation position (playback start position). In other words, the time is time required for completion of the processing in steps S101 to S106. It is to be noted that the time required for the data reading in is referred to as "data read-in time".

Figure 19:
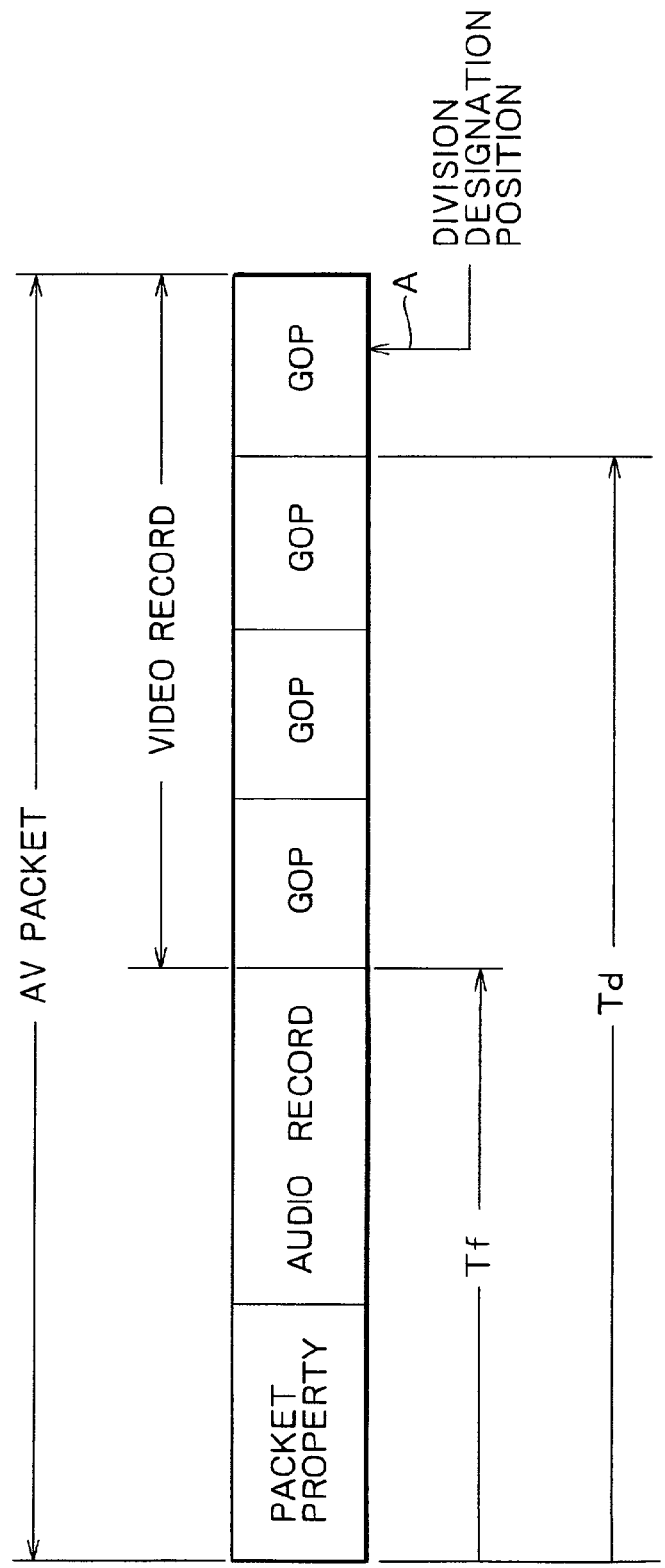
FIG. 19 is a diagrammatic view illustrating data read-in time.

If the track is played back in an ordinary manner as seen in FIG. 19, since the playback start position of the image frame is the top of the video record, the time until the AV packet is read in and the GOP positioned at the top of the video record can be accessed, that is, the data read-in time, is Tf, which is the shortest time.

In contrast, if the GOP including the GOP data (frame) as the dividing designation position is, for example, the fourth GOP which is the last GOP of the video record as indicated by an arrow mark A in FIG. 19, then the data read-in time is denoted by Td. In other words, the time Td is longer than the time Tf.

In this manner, the data read-in time Td becomes long as the GOP including the division designation position is disposed at a position farther from the top in the AV packet.

The playback standby time further includes, in addition to the data read-in time Td described above, time required for decoding of the GOP including the division designation position until the frame image data (GOP data) corresponding to the division designation position is decoded finally. In short, this is the time required for the processing in step S107→step S108 in the playback process illustrated in FIG. 17. It is to be noted that the time required for decoding of a GOP unit is referred to as "GOP data analysis time".

The GOP is a minimum editing unit of data coded in accordance with the MPEG system as well known in the art, and for example, in the present embodiment, the GOP is a group of totaling 15 frames including at least one frame image data (I picture) of a reference required for playback. GOPs are independent of each other and can form a closed bit stream. A GOP can be formed from three kinds of frame image data including an I picture (Intra Picture: intra-frame coded image), a P picture (Predictive Picture: inter-frame forward predictive coded image) and a B picture (Bidirectionally Picture: bidirectionally predictive coded image).

The I picture is frame image data which serves as a reference, and one or more I pictures are present in each GOP without fail. The I picture allows predictive coding in the frame. The presence of the frame keeps the independence of the GOP, and the frame image data are preferentially processed first.

The P picture is frame image data for which predictive coding is performed with a forward I picture or P picture referred to, and is processed after an I picture or a P picture positioned forwardly is processed.

The B picture is frame image data interposed between an I picture or I pictures and a P picture or P pictures and is processed after all of an I picture or I pictures and a P picture or P pictures positioned forwardly and one I picture and one P picture positioned rearwardly are processed.

Figure 20:
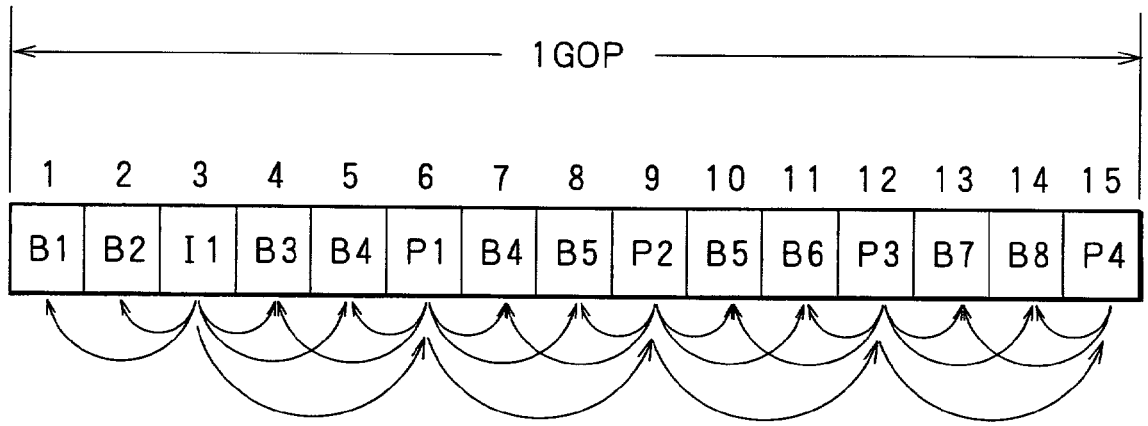
FIG. 20 is a diagrammatic view illustrating a decoding process for a GOP of the MPEG system.

An embodiment of a structure of inter-frame prediction in one GOP is illustrated in FIG. 20.

In this figure, one GOP is composed of, for example, 15 frames so as to conform to the present embodiment. In this instance, since random access in one GOP is required, at least one frame of the I picture is required in a GOP. Consequently, one GOP includes one frame of the I picture, four frames of the P picture which requires prediction from an I picture or a P picture positioned forwardly in time, and the remaining 10 frames of the B picture which requires prediction from an I picture or I pictures or/and a P picture or P pictures which are positioned in the opposite directions in time.

The I picture I1 is predictive coded only within the frame.

The P picture P1 is inter-frame predictive coded by reference to the I picture I1, and the P picture P2 is inter-frame predictive coded by reference to the P picture P1. The P picture P3 is inter-frame predictive coded by reference to the P picture P2, and the P picture P4 is inter-frame predictive coded by reference to the picture P3.

The B pictures B3 and B4 are inter-frame predictive coded by reference to the I picture I1 and the P picture P1, and the B pictures B4 and B5 are inter-frame predictive coded by reference to two pictures of the P picture P1 and the P picture P2. Thereafter, predictive coding is performed similarly as indicated by arrow marks, and the following pictures (frame image data) are decoded.

It is to be noted that the numbers of the numerals 1 to 15 indicated outside the framework of the figure indicate an outputting order of the frames of the original images.

Decoding processing of the individual frame image data proceeds in such a manner as described above in the GOP, and in order to decode certain frame image data, frame image data to be decoded prior to the certain frame image data must be processed in accordance with a predetermined order. Accordingly, depending upon the type and the position of frame image data designated as the division designation position, considerable time is required after decoding of the GOP is started until the frame image data at the division designation position is decoded. This is the "GOP data analysis time". A embodiment is described below.

Figure 21A:
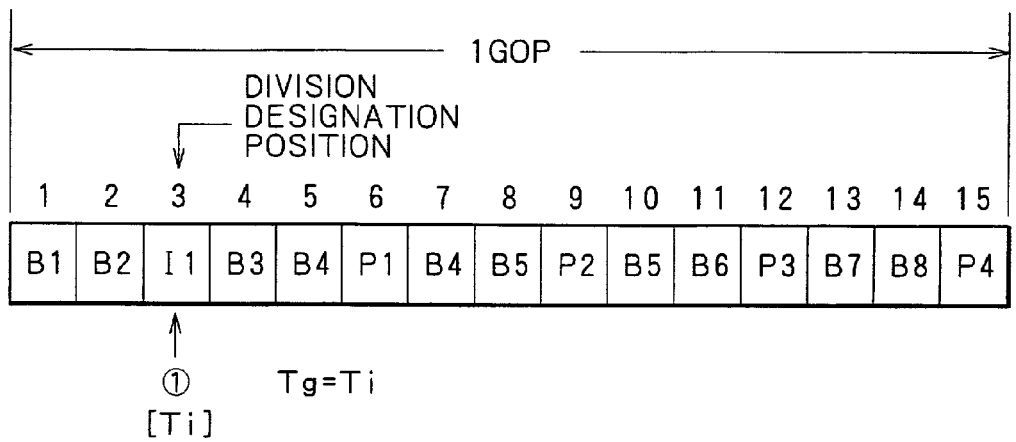
FIGS. 21A to 21C are diagrammatic views illustrating an example of difference in GOP data analysis time according to a division designation position.
Figure 21B:
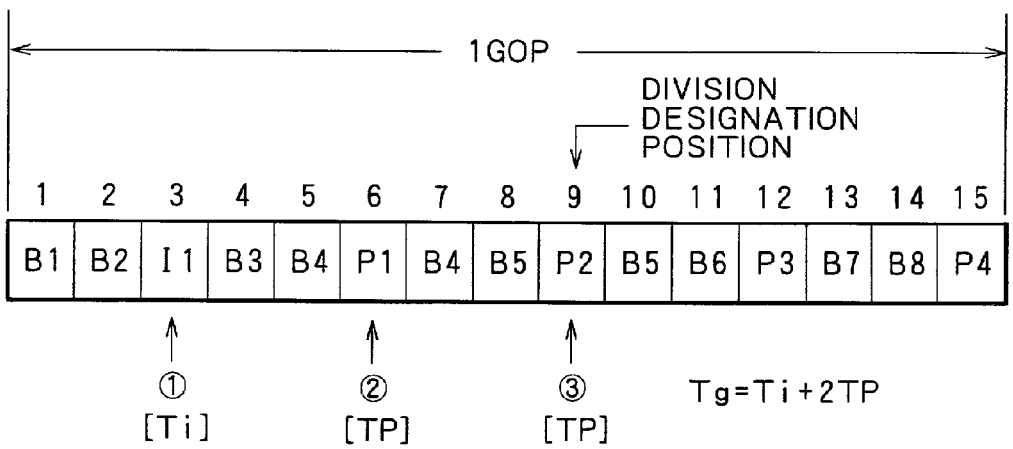
Figure 21C:
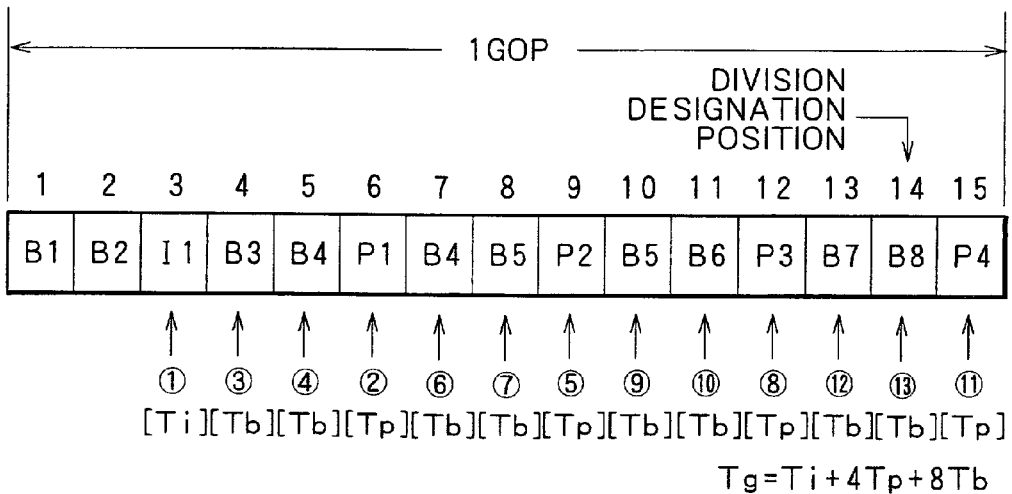

FIGS. 21A to 21C illustrate GOP data analysis times according to the difference in division designation position. It is to be noted that the numbers indicated in ○ in the figures indicate a decoding processing order.

It is assumed here that one GOP data wherein frame image data are disposed in such a manner as seen in, for example, FIG. 21A and, for example, the I picture I1 which is the third in the decoding outputting order is designated as the division designation position.

This I picture I1 is used as an I picture which is positioned most forwardly in the GOP, and accordingly, upon decoding of the GOP, it is the frame image data (GOP data) which is decoded first. Here, if the time required for decoding of the single I picture is represented by Ti and the GOP data analysis time required then is represented by Tg, then, for the case illustrated in FIG. 21A, the time Tg can be presented as $$Tg=Ti$$

Meanwhile, where the P picture P2 which is the ninth in the decoding outputting order is designated as the division designation position as seen in FIG. 21B, according to the decoding rule for a GOP, the I picture I1 is decoded first, and then the P picture P1 is decoded second, whereafter the P picture P2 is decoded third. In short, one I picture is decoded and two P pictures are decoded.

Accordingly, where the time required to decode one I picture is represented by Ti similarly as described above and the time required to decode one P picture is represented by Tp, the GOP data analysis time Tg in this instance is represented as $$Tg=Ti+2\times Tp$$

and it can be seen that longer time than that illustrated, for example, in FIG. 21A is required.

Further, where the B picture B8 which is the fourteenth in the decoding outputting order is designated as the division designation position as seen in FIG. 21C, decoding of the frame image data must be performed in an order indicated by the numbers in ○ of the figure, and finally, decoding of the B picture B8 is ended at the 13th in the decoding order.

In this instance, where the time required for decoding of one I picture is represented by Ti and the time required for decoding of one P picture is represented by Tp and besides the time required for decoding of one B picture is represented by Tb, the GOP data analysis time Tg is represented as $$Tg=Ti+2\times Tp+8\times Tb$$

and this is further longer time than that in the case of FIG. 21B.

As can be seen from the foregoing description, the "playback standby time" in the present embodiment depends upon the data read-in time Td and the GOP data analysis time Tg. In this instance, where the playback standby time is represented by Ts, then it is represented as $$Ts=Td+Tg$$

In the present embodiment, upon the division editing operation described with reference to FIGS. 16A to 16D, the playback standby time Ts is calculated in accordance with the foregoing description in response to the division designation position set on the pause screen. Then, the smoothness degree is determined based on the playback standby time Ts to perform display.

It is to be noted that, for example, depending upon actual playback processing, the period of a data read-in operation calculated as the data read-in time Td and the period of a GOP data decoding operation calculated as the GOP data analysis time Tg may possibly overlap with each other, but the playback standby time is represented by the relational expression given above for simplified description. Accordingly, actually a more complicated function or expression may be used.

9-4. Division Editing Process

Subsequently, a processing operation for overlapping display of a smoothness degree when the pause screen shown in FIG. 16B or 16C is displayed is described based on the foregoing description with reference to flowcharts of FIGS. 22 and 23.

It is to be noted that also the present process is realized as the video controller 38 functions as a master controller and the data processing/system control circuit 31, the driver controller 46 or the like executes control processing suitably.

For example, if a pause operation is performed when track playback is being performed based on the selection track playback screen shown in FIG. 16B in such a manner as described hereinabove with reference also to FIGS. 16A to 16D, then the video controller 38 advances its processing to step S201 of FIG. 22 in order that the pause screen shown in FIG. 16C may be displayed.

In step S201, control processing for displaying and outputting GOP data corresponding to a pause position set at present, that is, a division designation position, that is, frame image data to the display region of the display panel section is executed. It is to be noted that, when this processing is executed first in response to a pause operation, frame image data displayed and outputted when the pause operation is performed is continuously outputted as a still picture and the data position of the frame image data is regarded as the division designation position. In this instance, for example, as shown also in FIG. 16C, also it is performed to display the "return" button BT4, the "advance" button BT5 and the "determination button" BT6 at the predetermined positions on the pause screen.

Then in next step S202, the playback standby time Ts which is produced when playback is started from the division designation position currently set is calculated. This calculation process is illustrated in FIG. 23.

Figure 23:
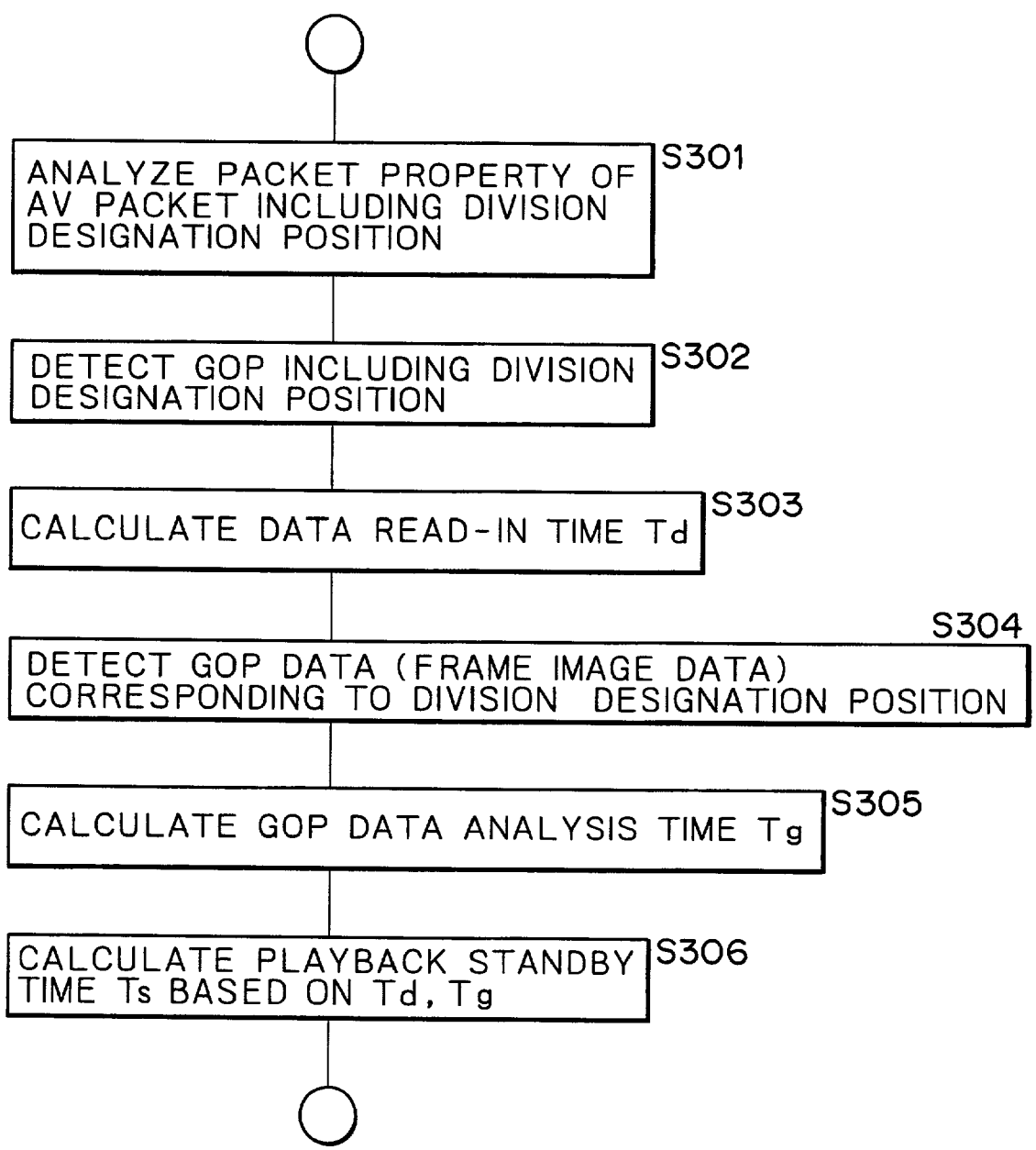
FIG. 23 is a flowchart illustrating processing operation for calculating playback standby time.

As seen in FIG. 23, upon calculation of the playback standby time Ts, the packet property of the AV packet including the division designation position currently set is read in and contents of the packet property are analyzed first in step S301. Then in next step S302, a GOP including the currently set division designation position is detected based on the analyzed contents of the packet property.

If a GOP is detected, then in next step S303, the data read-in time Td (refer to FIG. 19) up to the GOP which includes the division designation position is calculated. To this end, a byte offset (refer to FIG. 18) up to the GOP including the division designation position is determined, and a data processing speed and so forth when data of the data size corresponding to the byte offset is read in are utilized to perform arithmetic operation in accordance with a predetermined expression.

Here, for example, the speed until the object GOP from the top position of the AV packet is read in, that is, the time required for a predetermined unit data length, depends upon, for example, also how to read the data. For example, it is also possible to jump by an amount corresponding to the byte offset up to the object GOP to access the object GOP or to actually perform reading in of the data successively from the top position of the AV packet. Anyway, it is possible to obtain the data read-in time Td by performing calculation based on the processing speed required until the object data is read in and the data size corresponding to the byte offset.

Then in next step S304, it is detected which frame image data in the GOP the GOP data (frame image data) corresponding to the division designation position is based on the contents of the packet property analyzed in preceding step S301.

Then, if the detection is performed, then in next step S305, decoding of the GOP unit is started based on the information of the detected position of the GOP, the picture type, the actual GOP decoding processing speed and so forth, and the time until the frame image data corresponding to the division designation position is detected and can be played back, displayed and outputted finally, that is, the GOP data analysis time Tg, is calculated.

By the processing till now, the data read-in time Td and the GOP data analysis time Tg which are components of the playback standby time Ts are obtained. Thus, in step S306, the playback standby time Ts is calculated based on the data read-in time Td and the GOP data analysis time Tg. For example, also as described above, the playback standby time Ts can be calculated simply by arithmetic operation represented by Ts=Td+Tg.

Figure 22:
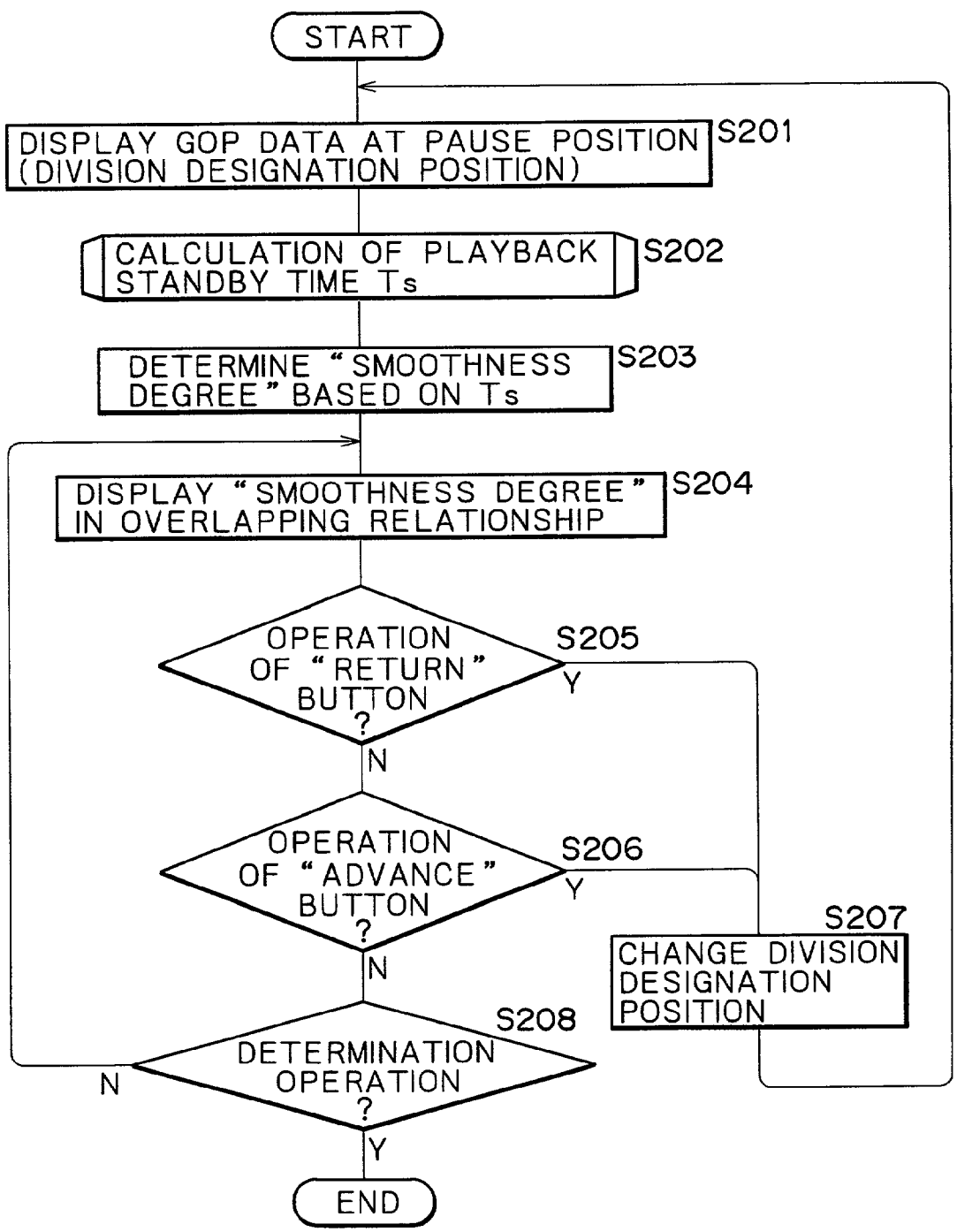
FIG. 22 is a flowchart illustrating processing operation for overlapping display of a smoothness degree when a pause screen is displayed.

After the calculation of the playback standby time Ts is performed in such a manner as described above, the video controller 38 advances its processing to step S203 of FIG. 22.

In step S203, the video controller 38 determines the value of the smoothness degree to be displayed in an overlapping relationship on the pause screen (refer to FIG. 16C) based on the playback standby time Ts calculated in step S202. Since the processing for this can be performed in various manners, detailed description is omitted herein. For example, the playback standby time Ts may be applied to a certain function to determine the value of the smoothness degree. And, where stepwise values for individual values at certain predetermined distances are used for the smoothness degree, for example, a table wherein values of the smoothness degree and ranges of the playback standby time are mapped with each other may be used and the table is referred to determine the value of the smoothness degree.

Then in next step S204, control processing is executed for displaying the value of the smoothness degree obtained by the processing in step S203 in an overlapping relationship on the pause screen in such a manner as illustrated, for example, in FIG. 16C.

As shown also in FIG. 16C, the "return" button BT4, "advance" button BT5 and "determination button" BT6 are displayed on the pause screen and can be operated by the user.

Thus, for example, in step S205 next to step S204, it is discriminated whether or not the "return" button BT4 is operated. Here, if an affirmative result is obtained, then the processing advances to step S207, but if a negative result is obtained, then the processing advances to step S206, in which it is discriminated whether or not the "advance" button BT5 is operated. Then, also when an affirmative result is obtained in step S206, the processing advances to step S207, but if a negative result is obtained, then the processing advances to step S208.

In the processing described above, if the "return" button BT4 or the "advance" button BT5 is operated in a condition wherein the pause screen is displayed, then the processing advances to step S207.

In step S207, processing for changing and setting the division designation position, for example, in a frame image data unit is executed in response to the operation of the "return" button BT4 or the "advance" button BT5. Then, the processing returns to step S201. When the processing returns from step S207 to step S201, image signal processing for changing the frame image data (GOP data) to be displayed and outputted as a still picture and display control are executed in step S201 in response to the division designation position (pause position) changed by the processing in step S207.

Then, if an operation of none of the "return" button BT4, "advance" button BT5 and "determination" button BT6 is performed in the state wherein the pause screen is displayed, then a negative result is obtained in step S208, and the processing returns to step S204. Depending upon the processing procedure, while pause display of the frame image data corresponding to the currently set division designation position is performed, the "smoothness degree of link" at the currently set division designation position is displayed in an overlapping relationship.

Then, if the determination button BT6 is operated, then an affirmative result is obtained in step S208. In this instance, though not shown, a process for an operation mode for displaying the division execution screen shown in FIG. 16D is performed. In other words, while the frame image data having been displayed upon the operation of the "determination" button BT6 is continuously displayed, the "stop" button BT7 or the "execution" button BT8 is displayed in an overlapping relationship to form the division execution screen, and the frame image data being displayed then is set as a final candidate to the division designation position. Then, a required process corresponding to the operation for the "stop" button BT7 or the "execution" button BT8 is performed. For example, if the "execution" button BT8 is operated, then the description contents of the script are re-written so that the file may be divided at the determined division designation position, for example, in such a manner as described hereinabove.

It is to be noted that the present invention is not limited to the construction described above and various modifications can be made.

For example, the compression format for moving picture data is not limited to the MPEG system including the MPEG2, but a compression technique of any other system may be adopted as described hereinabove. Further, the recording format is not limited to the example described as the embodiment. Further, the present invention can be applied not only to moving picture data but also where, for example, division editing of audio data or the like is performed. Further, while, in the embodiment, the playback standby time is evaluated as evaluation of a playback state of a file obtained by division, it is otherwise possible to evaluate, for example, a playback state whose notification to the user is advantageous and notify the user of a result of the evaluation through display or the like.

Furthermore, for example, the recording medium to which the present invention conforms can be applied also to a video camera apparatus which is ready for a recording medium for which a disk medium of a type different from an MD or a memory element such as a flash memory. Further, the recording medium can be applied also to a video camera ready for a tape medium.

Further, the present invention can be applied not only to a video apparatus but also other various audio and video apparatus which can record and play back a predetermined kind of recording medium.

While a preferred embodiment of the present invention has been described using specific terms, such description is for illustrative purposes only, and it is to be understood that changes and variations may be made without departing from the spirit or scope of the following claims.

What is claimed is:

1. An editing apparatus for editing coded data coded in a predetermined unit to be stored into a storage medium, comprising:
   designation means for designating an editing position of the coded data;
   evaluation means for evaluating a playback state according to a playback standby time required to start playback after an instruction to play back the coded data from the editing position designated by said designation means; and
   notification means for notifying a user of said editing apparatus of an evaluation result by said evaluation means.

2. An editing apparatus according to claim 1, wherein said evaluation means outputs, as the evaluation result, a playback standby time required to start playback after an instruction to play back the coded data from the editing position is issued.

3. An editing apparatus according to claim 2, wherein said evaluation means outputs a playback continuity degree representative of continuity of playback based on the playback standby time to be outputted, and said notification means causes the playback continuity degree outputted from said evaluation means to be displayed on a display section.

4. An editing apparatus according to claim 2, wherein said evaluation means arithmetically operates, as the playback standby time, at least a data readout time required to read out packet data including a plurality of coded data units from the top of the packet data to that one of the coded data units which includes the editing position.

5. An editing apparatus according to claim 2, wherein the storage medium is a disk, said editing apparatus further comprising:
readout means for accessing a predetermined position of the disk to read out data recorded at the predetermined position of the disk,
said evaluation means arithmetically operating, as the playback standby time, at least a time required to read out header information of packet data including a plurality of coded data units and an access time required for said readout means to access the disk in accordance with a physical top address of one of the coded data units which includes the editing position detected from the header information.

6. An editing apparatus according to claim 4, wherein said evaluation means arithmetically operates, as the playback standby time, a decoding time required to decode the coded data unit including the editing position up to the coded data including the editing position, the playback standby time being arithmetically operated by addition of the decoding time to the data readout time.

7. An editing apparatus according to claim 1, further comprising:
determination means for determining the editing position; and
updating means for updating a script for controlling playback of the coded data recorded on the recording medium in response to the editing position determined by said determination means;
the script being stored in a corresponding relationship to the coded data into the storage medium.

8. An editing apparatus according to claim 7, wherein the storage medium has a plurality of coded data stored therein, said editing apparatus further comprising:
selection means for selecting one of the plurality of coded data;
decoding means for decoding the coded data selected by said selection means and outputting resulting decoded data; and
outputting means for outputting the decoded data in a predetermined unit,
said updating means recording the last unit when first coded data to be obtained by division of the coded data based on the editing position is outputted in the predetermined unit by said outputting means and the top unit of second coded data succeeding the first coded data into the script,
said selection means being operable to select one of the first coded data and the second coded data,
said decoding means and said outputting means being operable to decode and output only one of the first coded data and the second data selected in accordance with the script.

9. An editing apparatus for editing coded image data having a plurality of groups of picture, comprising:
a decoding section for decoding the coded image data and outputting decoded image data;
a display section for displaying the decoded image data outputted from said decoding section;
a display control section for controlling said display section to temporarily stop the display with a frame or field at a desired position of the decoded image data displayed by said display section in accordance with an instruction of a user; and
an evaluation section for evaluating, when the decoded image data are divided into first image data and second image data in accordance with the instruction of the user, a playback state of the second image data;
said display control section controlling said display section to display an evaluation result by said evaluation section.

10. An editing apparatus according to claim 9, wherein said evaluation section accesses packet data including a group of picture corresponding to a desired position of the decoded image data to read out the packet data, analyses the read out packet data, detects a position of the group of picture corresponding to the desired position in response to a result of the analysis, and arithmetically operates a data readout time based on the position of the group of picture.

11. An editing apparatus according to claim 10, wherein said evaluation section detects the coded image data corresponding to the desired position in the detected group of picture, analyzes the image data to arithmetically operate data decoding time which is decoding time for the coded image data, and adds the data readout time and the data decoding time to arithmetically operate the playback standby time.

12. An editing apparatus according to claim 9, further comprising a readout section for reading out data from a disk on which the coded image data are recorded.

13. An editing apparatus according to claim 12, said disk is an optical disk comprising:
first tracks including a wobbled track and a non-wobbled track each implemented by either a land or a groove where a wobbled track is a track with both side surfaces thereof wobbled whereas a non-wobbled track is a track with neither of side surfaces thereof wobbled; and
second tracks each sandwiched by said first tracks and used for recording data wherein if said first track is implemented by a groove,
said second track is implemented by a land and if said first track is implemented by a land, said second track is implemented by groove.

14. An editing apparatus according to claim 13, further comprising:
an image pickup section for photoelectrically converting light reflected from an image pickup object into image data;
a compression section for compressing the image data into the coded image data in accordance with the MPEG system; and
a recording section for recording the compressed coded image data onto the disk.

15. An editing apparatus according to claim 12, wherein coded audio data are recorded on the disk.

16. A method of editing coded data coded in a predetermined unit to be stored into a storage medium, comprising the steps of:
designating an editing position of the coded data;
evaluating a playback state according to a playback standby time required to start playback after an instruction to play back the coded data from the designated editing position; and
notifying a user of a result of the evaluation.

17. A method of editing coded image data having a plurality of groups of picture, comprising the steps of:
- decoding the coded image data and outputting decoded image data;
- displaying the outputted decoded image data on a display section;
- temporarily stopping the display with a frame or field at a desired position of the displayed decoded image data in accordance with a user instruction; and
- evaluating, when the decoded image data are divided at the desired position into first image data and second image data, a playback state of the second image data; and
- displaying a result of the evaluation on the display section.

18. An editing apparatus for editing coded data coded in a predetermined unit to be stored into a storage medium, comprising:
- a designator for designating an editing position of the coded data;
- an evaluator for evaluating a playback state according to a playback standby time required to start playback after an instruction to play back the coded data from the editing position designated by said designator; and
- a notifier for notifying a user of said editing apparatus of an evaluation result by said evaluator.

* * * * *